(12) United States Patent
Yin et al.

(10) Patent No.: US 10,768,976 B2
(45) Date of Patent: Sep. 8, 2020

(54) APPARATUS AND METHOD TO CONFIGURE AN OPTIMUM NUMBER OF CIRCUITS FOR EXECUTING TASKS

(71) Applicant: FUJITSU LIMITED, Kawasaki-shi, Kanagawa (JP)

(72) Inventors: Fang Yin, Kawasaki (JP); Yasuhiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 15/489,309

(22) Filed: Apr. 17, 2017

(65) Prior Publication Data

US 2017/0329631 A1 Nov. 16, 2017

(30) Foreign Application Priority Data

May 11, 2016 (JP) .................. 2016-095150

(51) Int. Cl.
*G06F 9/48* (2006.01)
*G06F 9/50* (2006.01)

(52) U.S. Cl.
CPC .......... *G06F 9/4843* (2013.01); *G06F 9/5011* (2013.01)

(58) Field of Classification Search
None
See application file for complete search history.

(56) References Cited

U.S. PATENT DOCUMENTS 8,843,932 B2 * 9/2014 Sohi ...................... G06F 9/5066
718/104
9,052,958 B2 * 6/2015 Coleman ............... G06F 9/5044
(Continued)

FOREIGN PATENT DOCUMENTS

| JP | 2002-26721 | 1/2002 |
|---|---|---|
| JP | 2011-186981 | 9/2011 |
| JP | 2011-203920 | 10/2011 |

OTHER PUBLICATIONS

Heiner et al., FPGA Partial Reconfiguration via Configuration Scrubbing, Oct. 2009, Dept. of Electrical and Computer Engineering Brigham Young University. pp. 99-104 (Year: 2009).*

(Continued)

*Primary Examiner* — Wynuel S Aquino
*Assistant Examiner* — Melissa A Headly
(74) *Attorney, Agent, or Firm* — Staas & Halsey LLP

(57) ABSTRACT

An apparatus includes a programmable circuit that configures circuits for executing tasks. The apparatus estimates an execution time-period required for executing a first task by first circuits configured in the programmable circuit, and determines a configuration number indicating a number of second circuits that are to be configured, in the programmable circuit, for executing a second task to be executed after the first task, based on the execution time-period and a configuration time-period required for configuring the configuration number of the second circuits in the programmable circuit. The apparatus causes the programmable circuit to configure, during execution of the first task, the configuration number of the second circuits, and adjusts the configuration number, based on a relationship between a time at which the first task is completed and a time at which configuration of the configuration number of the second circuits in the programmable circuit is completed.

9 Claims, 12 Drawing Sheets

(56) References Cited

U.S. PATENT DOCUMENTS

| | | |
|---|---|---|
| 2011/0225415 A1 | 9/2011 | Yamada et al. |
| 2011/0238954 A1 | 9/2011 | Naito et al. |
| 2014/0173618 A1* | 6/2014 | Neuman ............... G06F 9/5066 718/104 |
| 2014/0344813 A1* | 11/2014 | Jamjoom .............. G06F 9/4881 718/101 |

OTHER PUBLICATIONS

Heiner et al., FPGA Partial Reconfiguration via Configuration Scrubbing, Oct. 2009, Dept. of Electrical and Computer Engineering Brigham Young University. pp. 99-104 (2009) (Year: 2009).*

* cited by examiner

| DATA SIZE OF CIRCUIT INFORMATION | TRANSFER RATE | TRANSFER TIME-PERIOD |
|---|---|---|
| 1 Mbyte | 256 kbps | 32 seconds |
| | 512 kbps | 16 seconds |
| | 1 Mbps | 8 seconds |
| | ... | ... |
| 2 Mbytes | 256 kbps | 64 seconds |
| | 512 kbps | 32 seconds |
| | 1 Mbps | 16 seconds |
| ... | ... | ... |

24

| TASK NAME | EXECUTION TIME-PERIOD |
|---|---|
| TASK 1 | T11 |
| TASK 2 | T21 |
| TASK 3 | T31 |
| TASK 1 | T12 |
| TASK 2 | T22 |
| TASK 3 | T32 |
| TASK 1 | T13 |
| TASK 2 | T23 |
| ... | ... |

22

APPARATUS AND METHOD TO CONFIGURE AN OPTIMUM NUMBER OF CIRCUITS FOR EXECUTING TASKS

CROSS-REFERENCE TO RELATED APPLICATION

This application is based upon and claims the benefit of priority of the prior Japanese Patent Application No. 2016-095150, filed on May 11, 2016, the entire contents of which are incorporated herein by reference.

FIELD

The embodiments discussed herein are related to apparatus and method to configure an optimum number of circuits for executing tasks.

BACKGROUND

Recently, a method for executing data processing while sequentially switching logic to be configured in a programmable device, such as a field-programmable gate array, in which logic is dynamically reconfigurable has been proposed. For example, the data processing is executed by a plurality of preceding circuits for executing a plurality of pre-processes and a succeeding circuit for executing a post-process using the results of the plurality of the post-processes, in a certain case. In this case, implementation methods of different types that are to simultaneously configure at least any of the preceding and succeeding circuits are prepared in advance, and a method for configuring circuits of which the size is the smallest is selected from among implementation methods in which data processing is completed within a target time period. When t is difficult to complete the data processing within the target time period, multiple logic components supported for the selected implementation method are configured in the programmable device and execute the data processing in parallel (refer to, for example, Japanese Laid-open Patent Publication No. 2011-203920).

When two circuits, which are connected to each other in series, are alternately configured and execute data processing, a succeeding circuit receives results of data processing that have been sequentially output from a preceding circuit and starts to execute next data processing, thereby reducing a time period to a time at which the last result of the processing is obtained (refer to, for example, Japanese Laid-open Patent Publication No. 2002-26721).

Since a plurality of circuits are sequentially configured based on the order of data processing and the respective circuits start to execute the data processing in the order of the configuration of the circuits, the circuits are configured in parallel with the data processing, thereby increasing the speed of the data processing, compared with a case where a plurality of circuits is collectively configured (refer to, for example, Japanese Laid-open Patent Publication No. 2011-186981).

SUMMARY

According to an aspect of the invention, an apparatus includes a programmable circuit that configures circuits for executing tasks. The apparatus estimates an execution time-period required for executing a first task by first circuits configured in the programmable circuit, and determines a configuration number indicating a number of second circuits that are to be configured, in the programmable circuit, for executing a second task to be executed after the first task, based on the estimated execution time-period and a configuration time-period required for configuring the configuration number of the second circuits in the programmable circuit. The apparatus causes the programmable circuit to configure, during execution of the first task, the configuration number of the second circuits, and adjusts the configuration number, based on a relationship between a time at which the first task is completed and a time at which configuration of the configuration number of the second circuits in the programmable circuit is completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of operations of a server, according to an embodiment;

FIG. 4 is a diagram illustrating an example of an execution time-period holding table and a configuration time-period holding table, according to an embodiment;

DESCRIPTION OF EMBODIMENTS

In the related arts described above, a time period for executing data processing may be different from an estimated execution time-period. Thus, when a circuit for executing next data processing is configured during the execution of the data processing, a relationship between a time when the data processing is completed and a time when the circuit is configured in parallel with the data processing may not be fixed.

If the completion time of the data processing is earlier than the completion time of the configuration of a circuit for executing the next data processing, the next data processing is not started until the completion of the configuration of the circuit. If the completion time of the data processing is later than the completion time of the configuration of a circuit for executing the next data processing, the next data processing is not started until the completion of the preceding data processing. Thus, if the time period for executing the data processing is different from the estimated execution time-period, the efficiency of the data processing may be reduced.

According to an aspect, it is desirable to reduce a total process time to a time when multiple tasks are completed in a case where a circuit for executing a succeeding task is configured during the execution of a preceding task.

Hereinafter, embodiments are described with reference to the accompanying drawings.

Figure 1:
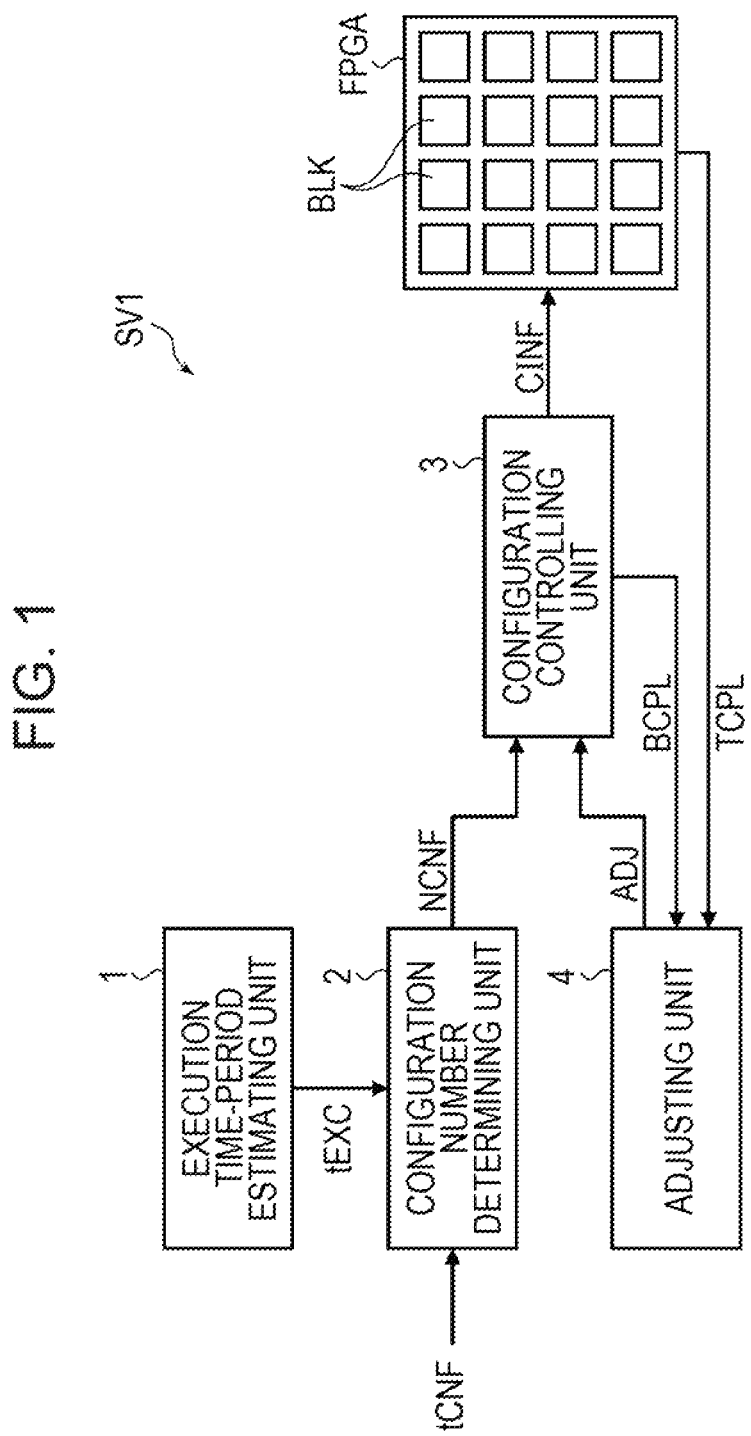
FIG. 1 is a diagram illustrating an example of a configuration of an information processing device, according to an embodiment.

FIG. 1 illustrates an embodiment of an information processing device, a method for controlling the information processing device, and a program for controlling the information processing device.

A server SV1 illustrated in FIG. 1 includes an execution time-period estimating unit 1, a configuration number determining unit 2, a configuration controlling unit 3, an adjusting unit 4, and an FPGA. The execution time-period estimating unit 1, the configuration number determining unit 2, the configuration controlling unit 3, and the adjusting unit 4 may be achieved by hardware included in the server SV1. Alternatively, the execution time-period estimating unit 1, the configuration number determining unit 2, the configuration controlling unit 3, and the adjusting unit 4 may be achieved by a control program executed by a processor such as a central processing unit (CPU) included in the server SV1. The server SV1 is an example of an information processing device. The information processing device may be configured as a computer device other than a server.

The server SV1 configures, in the FPGA during the execution of a preceding task, a succeeding circuit for executing a succeeding task after the preceding task. Specifically, the succeeding circuit is configured in the FPGA in the background of the execution of the preceding task. For example, the FPGA includes multiple blocks BLK in which the circuits for executing the tasks are reconfigurable. The number of the blocks BLK included in the FPGA is not limited to 16. The FPGA is an example of a programmable circuit that is able to reconfigure circuits for executing tasks.

The execution time-period estimating unit 1 estimates a time period tEXC required for executing a task by using a predetermined number of circuits configured in the FPGA. When multiple circuits are configured in the FPGA, the execution time-period tEXC is a time period during which the multiple circuits execute the task in parallel. The configuration number determining unit 2 determines the number NCNF of succeeding circuits to be configured in the FPGA, based on the execution time-period tEXC, estimated by the execution time-period estimating unit 1, for executing the preceding task and a time period tCNF for configuring a succeeding circuit for executing the succeeding task in the FPGA. For example, the configuration time-period tCNF is a time period required for configuring a single succeeding circuit in the FPGA. Hereinafter, the number NCNF of succeeding circuits configured or to be configured in the FPGA to execute the succeeding task in parallel is also referred to as a task-parallel number.

The configuration controlling unit 3 sequentially configures succeeding circuits in the FPGA by sequentially transferring, during the execution of the preceding task, circuit information CINF on the succeeding circuits whose number is equal to the number NCNF determined by the configuration number determining unit 2.

The adjusting unit 4 outputs, to the configuration controlling unit 3, adjustment information ADJ to be used to cause the configuration controlling unit 3 to adjust the number of succeeding circuits to be configured in the FPGA, based on a relationship between a time when the preceding task is completed and a time when the configuration of the succeeding circuits in the FPGA is completed. For example, the adjusting unit 4 detects, based on a completion notification CPL output by the FPGA upon the completion of the preceding task, a time when the preceding task is completed, and the adjusting unit 4 detects, based on a completion notification BCPL output by the configuration controlling unit 3 upon the completion of the configuration of circuits, a time when the configuration of the succeeding circuits in the FPGA is completed.

When receiving the completion notification TCPL before the reception of the completion notification BCPL, the adjusting unit 4 detects that the preceding task has been completed before the completion of the configuration of the succeeding circuits in the FPGA. When receiving the completion notification BCPL before the reception of the completion notification TCPL, the adjusting unit 4 detects that the configuration of the succeeding circuits in the FPGA has been completed before the completion of the preceding task.

Figure 2:
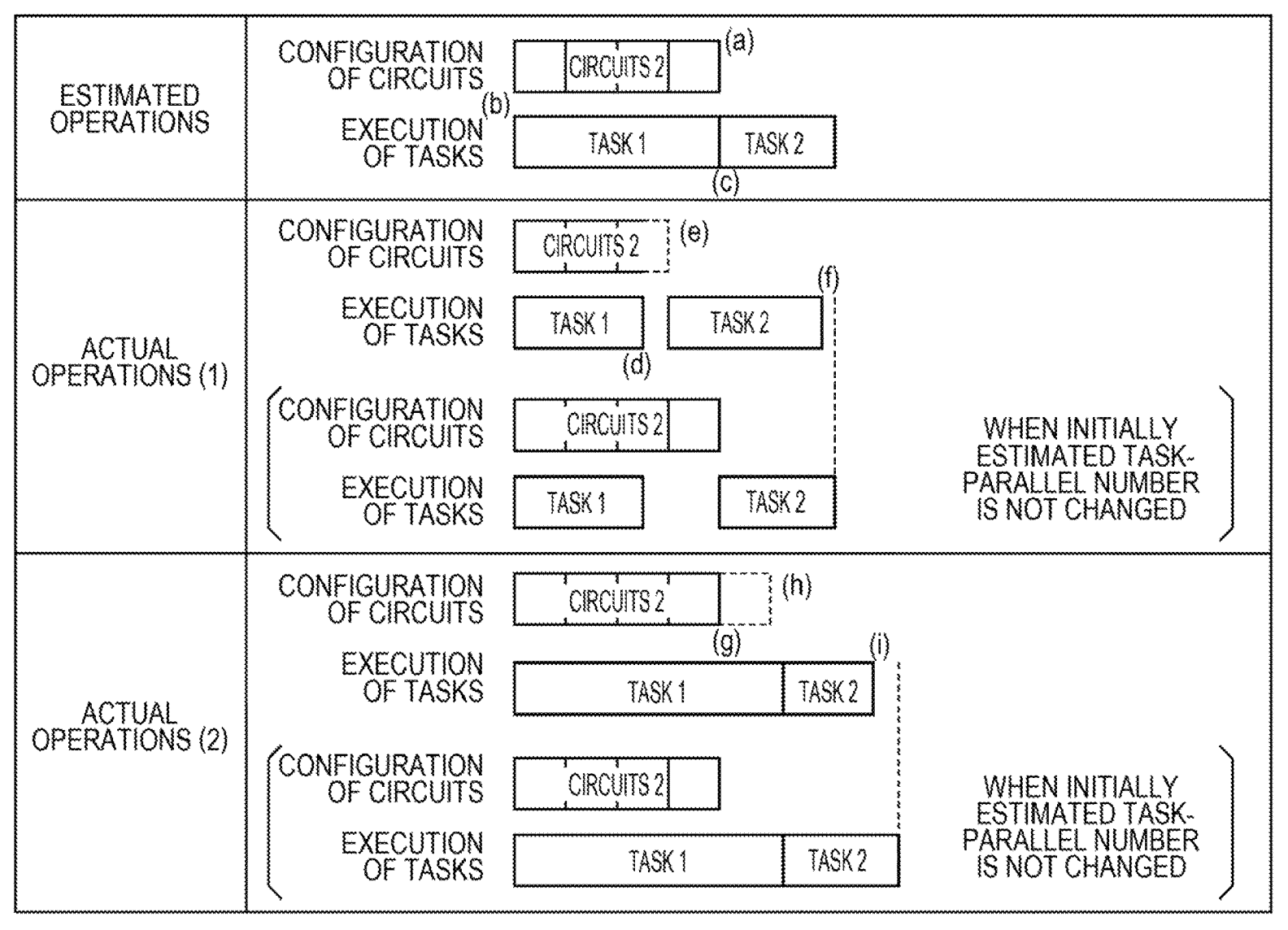

FIG. 2 illustrates an example of operations of the server SV1 illustrated in FIG. 1. Operations illustrated in FIG. 2 are achieved by hardware included in the server SV1 illustrated in FIG. 1 or are achieved by the control program executed by the processor included in the server SV1 illustrated in FIG. 1. FIG. 2 illustrates an example of the method for controlling the information processing device and the program for controlling the information processing device.

In FIG. 2, horizontal widths of rectangles indicating the "configuration of circuits" indicate time periods for configuring the circuits in blocks BLK, and horizontal widths of rectangles indicating the "execution of tasks" indicate time periods for executing the tasks. In FIG. 2, a preceding task is a task 1 and a succeeding task is a task 2. Circuits 2 are succeeding circuits for executing the task 2. Circuits 1 for executing the task 1 are configured in blocks BLK of the FPGA before the execution of the task 1.

For example, the configuration number determining unit 2 calculates the number of circuits 2 that is able to be configured in the FPGA during the execution of the task 1, by dividing a time period tEXC, estimated by the execution time-period estimating unit 1, for executing the task 1 by a time period for configuring a single circuit 2 in the FPGA ((a) illustrated in FIG. 2). The number of circuits 2 to be configured in the FPGA is calculated by the configuration number determining unit 2 before the start of the execution of the task 1.

Upon start of the execution of the task 1, the configuration controlling unit 3 starts to configure, in the FPGA, circuits 2 whose number is equal to the number NCNF calculated by the configuration number determining unit 2 ((b) illustrated in FIG. 2). Then, after the task 1 is completed and the configuration of the circuits 2 in the FPGA is completed, the execution of the task 2 is started ((c) illustrated in FIG. 2). In this manner, the server SV1 executes a pipeline process of sequentially configuring circuits and sequentially executing tasks in parallel.

In "estimated operations" illustrated in FIG. 2, the task 2 is executed by four circuits 2 in parallel, and a time period for executing the task 2 by the four circuits 2 is 25% of a time period for executing the task 2 by a single circuit 2. If a task 3 (not illustrated) is executed after the task 2, the configuration of circuits 3 (not illustrated) for executing the task 3 in the FPGA is started upon the start of the execution of the task 2.

In "actual operations (1)", the completion of the execution of the task 1 is earlier than that in the "estimated operations" ((d) illustrated in FIG. 2). For example, the task 1 is completed during the configuration of the third circuit 2. When receiving the completion notification TCPL before the reception of the completion notification BCPL, the adjusting unit 4 outputs, to the configuration controlling unit 3, adjustment information ADJ to be used to change the number of circuits 2 to be configured in the FPGA to 3 that is the number of circuits 2 including currently configured circuit 2, instead of 4 that has been determined by the configuration number determining unit 2. That is, the adjusting unit 4 causes the configuration controlling unit 3 to adjust the number of circuits 2 to be configured in the FPGA from 4 to 3.

When the number of circuits 2 to be configured in the FPGA is reduced from 4 to 3, a task 2 parallel number is reduced from "4" to "3" and a time period for executing the task 2 becomes longer than a time period for executing the task 2 in the "estimated operations", ((f) illustrated in FIG. 2). However, a time when the execution of the task 2 is started becomes earlier than a time when the execution of the task 2 is started in the case where the number of circuits 2 to be configured in the FPGA is 4.

If the initially estimated task 2 parallel number is not changed, the execution of the task 2 is started after the configuration of the circuits 2 in the FPGA. As a result, in the operations illustrated in FIG. 2, the completion time of the task 2 in the case where the number of circuits 4 to be configured in the FPGA is adjusted from 4 to 3 may become earlier than the completion time of the task 2 in the case where the number of circuits 2 to be configured in the FPGA is not changed or is 4. As a result, the total process time of the tasks 1 and 2 in the case where the number of circuits 2 to be configured in the FPGA is adjusted from 4 to 3 may be reduced, compared with the total process time of the tasks 1 and 2 in the case where the number of circuits 2 to be configured in the FPGA is not changed or is 4.

In "actual operations (2)", the execution of the task 1 becomes later than that in the "estimated operations", and the configuration of the four circuits 2 in the FPGA is completed before the completion of the task 1 ((g) illustrated in FIG. 2). When the adjusting unit 4 receives the completion notification BCPL before receiving the completion notification TCPL, and circuits 2 whose number is larger than the number determined by the configuration determining unit 2 is able to be configured in the FPGA before the completion of the task 1, the adjusting unit 4 outputs, to the configuration controlling unit 3, adjustment information ADJ to be used to increase the number of circuits 2 to be configured in the FPGA. In this example, the adjusting unit 4 outputs, to the configuration controlling unit 3, adjustment information ADJ that causes the configuration controlling unit 3 to adjust the number of succeeding circuits to be configured in the FPGA from 4 to 5 ((h) illustrated in FIG. 2).

When the number of circuits 2 to be configured in the FPGA is increased from 4 to 5, the task 2 parallel number is increased from 4 to 5, and the time period for executing the task 2 becomes shorter than the time period for executing the task 2 in the "estimated operations" ((i) illustrated in FIG. 2). IN other words, the time period for executing the task 2 is reduced by the increase in the task 2 parallel number.

If the initially estimated task 2 parallel number is not changed, the execution of the task 2 is started after the completion of the execution of the task 1. As a result, in the operations illustrated in FIG. 2, the completion time of the task 2 in the case where the number of circuits 2 to be configured in the FPGA is adjusted from 4 to 5 may become earlier than the completion time of the task 2 in the case where the number of circuits 2 to be configured in the FPGA is not changed or is 4. As a result, the total process time of the tasks 1 and 2 in the case where the number of circuits 4 to be configured in the FPGA is adjusted from 4 to 5 may be reduced, compared with the case where the number of circuits 2 to be configured in the FPGA is not changed or is 4.

In the embodiment described with reference to FIGS. 1 and 2, the number of succeeding circuits to be configured in the FPGA is adjusted based on a relationship between the completion time of the preceding task and the completion time of the configuration of succeeding circuits for executing the succeeding task in the FPGA. Thus, succeeding circuits may be configured in the background of the execution of the preceding task, and the total process time of the tasks by the information processing device that sequentially executes the tasks may be reduced, compared with conventional techniques.

Figure 3:
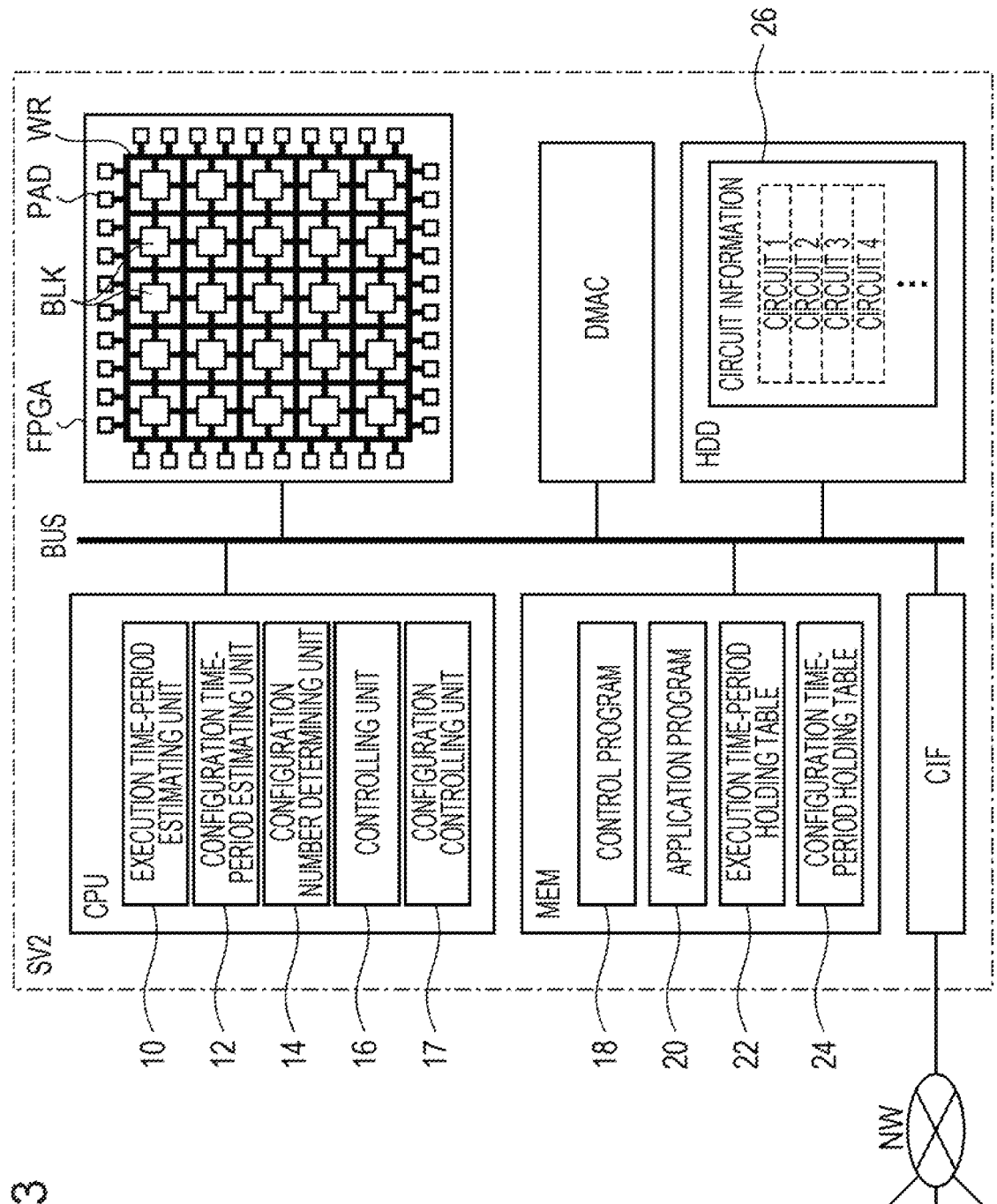
FIG. 3 is a diagram illustrating an example of a configuration of an information processing device, according to an embodiment.

FIG. 3 illustrates another embodiment of the information processing device, the method for controlling the information processing device, and the program for controlling the information processing device. Elements that are illustrated in FIG. 3 and are the same as or similar to the elements described with reference to FIGS. 1 and 2, are indicated by the same reference numerals as those illustrated in FIGS. 1 and 2, and a detailed description thereof is omitted. A server SV2 illustrated in FIG. 3 includes a central processing unit (CPU), a memory MEM, a communication interface CIF, an FPGA, a direct memory access control unit (DMAC), and a hard disk drive (HDD) that are coupled to each other via a bus BUS. The server SV2 is an example of the information processing device.

The CPU controls operations of the whole server SV2. The CPU executes a control program stored in the memory MEM, thereby functioning as an execution time-period estimating unit 10, a configuration time-period estimating unit 12, a configuration number determining unit 14, a controlling unit 16, and a configuration controlling unit 17. The execution time-period estimating unit 10 estimates time periods for executing tasks by circuits configured in the FPGA.

The configuration time-period estimating unit 12 references a configuration time-period holding table 24 (described later), and estimates a time period required for transferring, to the FPGA, circuit information held in the HDD. The FPGA writes the circuit information transferred from the HDD in a lookup table or the like, thereby configuring the circuits. Thus, the sum of a time period for transferring the circuit information from the HDD to the FPGA and a time period for writing the circuit information in the FPGA is a time period required for configuring the circuits in the FPGA. However, since the time period for transferring the circuit information is dominant compared to the time period for writing the circuit information, the time period for configuring the circuits in the FPGA is nearly equal to the time period for transferring the circuit information. Even if a data transfer rate of a transfer path such as the bus BS for transferring circuit information is changed, the time period for transferring the circuit information may be accurately estimated by causing the configuration time-period estimating unit 12 to calculate the time period for transferring the circuit information.

The configuration number determining unit 14 determines a task-parallel number or the number of circuits to be configured in the FPGA to execute a task in parallel.

The CPU executes an application program for controlling operations (or tasks) of circuits configured in the FPGA. The application program may be prepared for each of multiple types of circuits, or application programs may be prepared in common for the multiple types of circuits. When the CPU includes multiple CPU cores, the control program and the application program may be executed by different CPU cores of the CPU. The application program may be executed by a virtual machine activated by the CPU or a CPU core of the CPU.

The controlling unit 16 adjusts the number of circuits to be configured in the FPGA, based on information obtained by operations of the execution time-period estimating unit 10, the configuration time-period estimating unit 12, and the configuration number determining unit 14. The controlling unit 16 is an example of an adjusting unit configured to adjust the number of succeeding circuits to be configured in the FPGA, based on a relationship between a time when a preceding task is completed and a time when the configuration of the succeeding circuits in the FPGA is completed.

The configuration controlling unit 17 executes control of the transfer of circuit information on circuits, held in the HDD, to the FPGA. For example, the configuration controlling unit 17 uses the DMAC to sequentially configure, during the execution of a task, circuits that are indicated in circuit information and whose number has been determined by the configuration number determining unit 14. The configuration controlling unit 17 may not use the DMAC and may sequentially configure, during the execution of the task, the circuits that are indicated in the circuit information and whose number has been determined by the configuration number determining unit 14. The controller 16 may be configured to include the function of the configuration controlling unit 17.

The memory MEM includes storage regions 18, 20, 22, and 24. The storage region 18 holds the control program to be executed by the CPU. The storage region 20 holds the application program to be executed by the CPU. For example, the application program is held in the HDD, and executed by the CPU after being transferred to the memory MEM.

An execution time-period holding table is assigned to the storage region 22. In the following description, the execution time-period holding table is referred to as execution time-period holding table 22. In the execution time-period holding table 22, information that indicates a time period, which was calculated based on a time period for executing a task by circuits configured in the FPGA in the past, for executing the task by a single circuit is stored. The time period for executing the task by a single circuit is an example of a standard execution time-period.

Every time a single task is completed, the CPU calculates, based on a time period for executing the task, a time period for executing the task by a single circuit, and stores information indicating the calculated time period for executing the task by a single circuit, in the execution time-period holding table for each circuit type. The time period for executing the task by a single circuit is calculated by multiplying the time period for executing the task by a task-parallel number (or the number of circuits required for executing the task in parallel).

In the execution time-period holding table 22, the average of values, each of which is obtained by converting the time periods required for executing the task in the past, into a time period for executing a task by a single circuit, may be stored. The execution time-period holding table 22 is referenced when the execution time-period estimating unit 10 estimates a time period for executing a task. In the execution time-period holding table 22, an initial value of a time period for executing a task by a single circuit corresponding to circuit information registered in the HDD s stored upon registration of the circuit information in the HDD. Thus, even in an initial state in which a task is not executed, the execution time-period estimating unit 10 may estimate a time period for executing the task. An initial value of a time period for executing, by a single circuit, a task for starting an operation of executing a task by the server SV, is a time period (calculated value or measured value) for executing a task for executing average processing. An example of the execution time-period holding table 22 is illustrated in FIG. 4.

The configuration time-period holding table is assigned to the storage region 24. In the following description, the configuration time-period holding table is also referred to as configuration time-period holding table 24. In the configuration time-period holding table 24, information that indicates a time period for transferring circuit information from the HDD to the FPGA is stored. An example of the configuration time-period holding table 24 is illustrated in FIG. 4.

The communication interface CIF is coupled to a network NW, such as the Internet or an intranet, receives information to be used in the server SV from the network NW, and transmits information processed in the server SV to the network NW.

The FPGA writes circuit information transferred from the HDD in the lookup table or the like, and has a plurality of blocks BLK, a plurality of external terminals PAD, and a wiring unit WR that couples the plurality of blocks BLK and the plurality of external terminals PAD to each other. In the plurality of blocks BLK, circuits are configured. The server SV may include another programmable circuit, instead of the FPGA, if a circuit for executing a task is reconfigurable in the other programmable unit.

The DMAC transfers, based on an instruction from the configuration controlling unit 17, circuit information on circuits, held in the HDD, to the FPGA. The transfer of the circuit information to the FPGA may be executed using a function, such as the controlling unit 16, that is included in the CPU. In this case, the controlling unit 16 functions as the configuration controlling unit for sequentially configuring, in the FPGA, the circuits that are indicated in the circuit information and whose number has been determined by the configuration number determining unit 14.

The HDD includes a storage region 26 that holds circuit information on multiple circuits (circuit 1, circuit 2, circuit 3, circuit 4, . . . ) to be configured in the FPGA. For example, the circuit information on the circuits is stored, in the HDD, from an external of the server SV2 via the communication interface CIF. The HDD includes a storage region in which the control program to be executed by the CPU is installed. In this case, the control program installed in the HDD is transferred to the memory MEM from the HDD upon execution of the control program.

FIG. 4 illustrates an example of the execution time-period holding table 22 illustrated in FIG. 3 and the configuration time-period holding table 24 illustrated in FIG. 3. The execution time-period holding table 22 includes a plurality of entries each including a region for holding information indicating names (task 1, task 2, task 3, . . . ) of tasks and a region for holding information indicating time periods (T11, T21, T21, T31, . . . ) for executing the tasks by a single circuit. Every time a task is completed, the controlling unit 16 calculates a time period for executing the task by a single circuit and causes information indicating the name of the task and information indicating the calculated time period for executing the task, to be stored in the execution time-period holding table 22.

The configuration time-period holding table 24 includes, for each of data sizes of circuit information on circuits to be configured in the FPGA, a region for holding information indicating transfer rates and a region for holding information indicating transfer time-periods. In the region for holding transfer rates, rates (for example, transfer rates of the bus BUS) of transferring circuit information from the HDD to the FPGA are stored. Before the configuration of the circuits in the FPGA, information indicating transfer time-periods that comply with the data sizes of the circuit information and the transfer rates, is stored in the region for holding transfer time-periods. The configuration time-period estimating unit 12 references the configuration time-period holding table 22, acquires a time period for transferring circuit information, and estimates a transfer time-period, based on the data size of circuit information to be transferred to the FPGA and a transfer rate of the bus BUS.

The configuration time-period holding table 22 may not include the region for holding information indicating transfer time-periods and may include the region for holding information indicating transfer rates for each of data sizes of circuit information. In this case, the configuration time-period estimating unit 12 calculates a time period for transferring circuit information from the HDD to the FPGA, based on information held in the configuration time-period holding table 22. If the rate of transferring data from the HDD to the FPGA is fixed, rates of transferring circuit information from the HDD to the FPGA may be stored in the configuration time-period holding table 24 for data sizes of the circuit information to be transferred to the FPGA. In addition, the server SV2 may not hold the configuration time-period holding table 24 and may cause the configuration time-period estimating unit 12 to calculate transfer time-periods. In this case, the configuration time-period estimating unit 12 reads data sizes of circuit information from information added to the circuit information held in the HDD, and divides the read data sizes by a detected transfer rate of the bus BUS, thereby calculating the transfer time-periods, for example.

Figure 5:
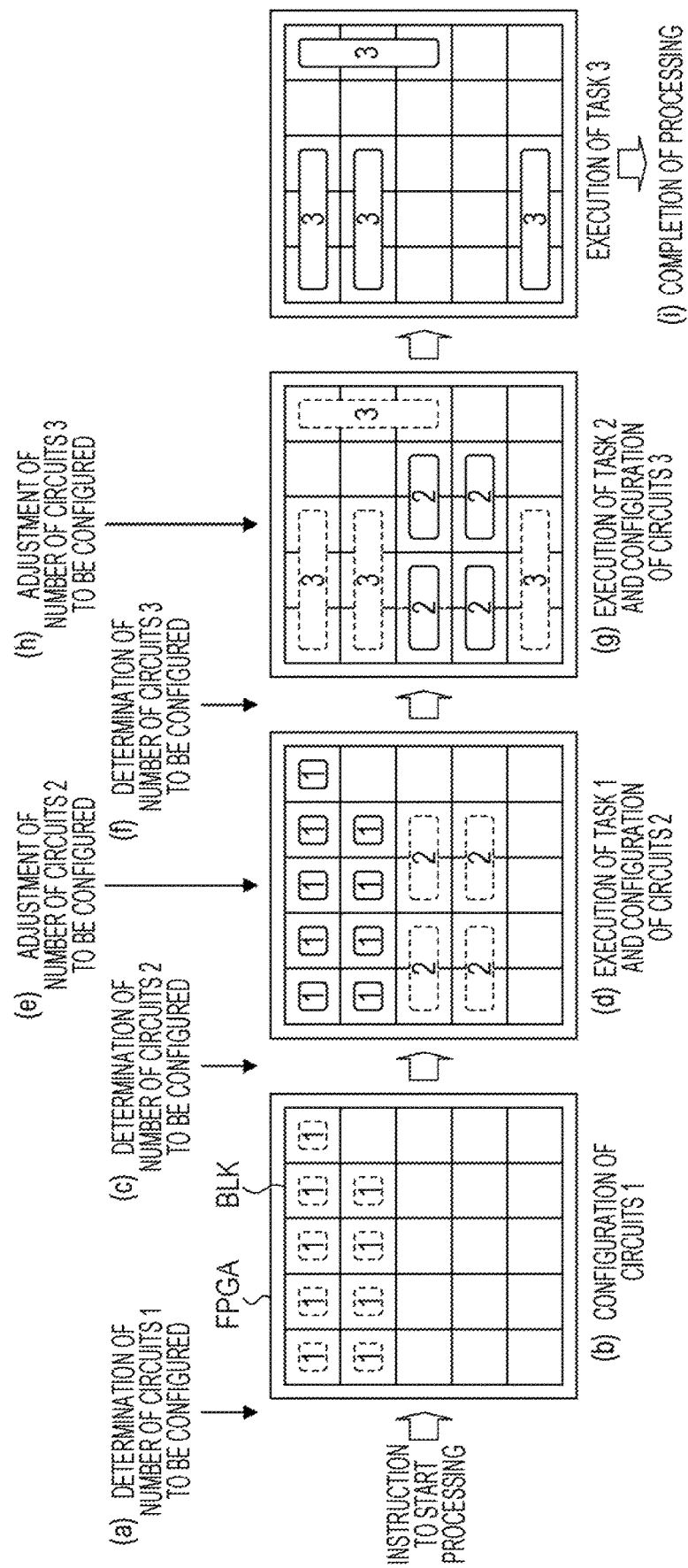
FIG. 5 is a diagram illustrating an example of operations of an FPGA controlled by a server, according to an embodiment.

FIG. 5 illustrates an example of operations of the FPGA controlled by the server SV2 illustrated in FIG. 3. Operations illustrated in FIG. 5 are achieved by causing the CPU of the server SV2 to execute the control program. Specifically, FIG. 5 illustrates an example of a process by the method and program for controlling the information processing device. In FIG. 5, rectangles indicated by broken lines in blocks BLK indicate that circuits are to be configured in the blocks BLK, while rectangles indicated by solid lines in blocks BLK indicate that circuits operate and execute tasks.

In the example illustrated in FIG. 5, the server SV2 sequentially configures circuits 1, circuits 2, and circuits 3 in predetermined numbers of blocks BLK included in the FPGA, causes the circuits configured in the blocks BLK to operate and sequentially execute a task 1, a task 2, and a task 3. In this example, the task 1 is executed by the circuits 1, the task 2 is executed by the circuits 2, and the task 3 is executed by the circuits 3. The server SV2 executes the operations illustrated in FIG. 5 by causing the controlling unit 16 illustrated in FIG. 3 to control the execution time-period estimating unit 10, the configuration time-period estimating unit 12, the configuration number determining unit 14, and the DMAC.

Each of the circuits 1 is configured in a single block BLK, and the nine circuits 1 execute the task 1 in parallel in 9 blocks. Each of the circuits 2 is configured in two blocks BLK, and the four circuits 2 execute the task 2 in parallel in 8 blocks. Each of the circuits 3 is configured in 3 blocks BLK, and the four circuits 3 execute the task 3 in parallel in 12 blocks.

In this manner, the plurality of circuits 1, the plurality of circuits 2, and the plurality of circuits 3 are sequentially configured in the blocks BLK whose numbers are based on the sizes of the circuits. The circuits 1 execute the task 1 in parallel, the circuits 2 execute the task 2 in parallel, and the circuits 3 execute the task 3 in parallel. A task-parallel number (or the number of circuits of the same type that are configured in the FPGA) is determined so as to minimize the sum of a time period for configuring the circuits in blocks BLK and a time period for executing the task. Specifically, the task-parallel number is determined so as to reduce the time period from a time when the configuration of the circuits in blocks BLK is started to a time when the execution of the task by the circuits configured in the blocks is completed. Alternatively, the task-parallel number may be determined so that a time period for executing a preceding task is equal to a time period for configuring, during the execution of the preceding task, circuits for executing a succeeding task. A time period for configuring circuits is nearly equal to a time period for transferring circuit information on the circuits from the HDD to the FPGA, as described above.

First, in response to an instruction to start processing, the execution time-period estimating unit 10 illustrated in FIG. 3 reads time periods (time periods for executing the task 1 by a single circuit) for executing the task 1 from the execution time-period holding table 22. The execution time-period estimating unit 10 calculates the average of the read time periods for executing the task 1 and treats the calculated average as an estimated value of a time period for executing the task 1 by a single circuit.

The configuration time-period estimating unit 12 illustrated in FIG. 3 reads, from the configuration time-period holding table 24, a time period (time period for configuration a single circuit) for transferring circuit information on the circuits 1 from the HDD to the FPGA, based on the size of the circuit information on the circuits 1 and the rate of transferring data from the HDD to the FPGA.

The configuration number determining unit 14 illustrated in FIG. 3 substitutes, into Equation (1), the estimated value (time period for executing the task by a single circuit), calculated by the execution time-period estimating unit 10, of the time period for executing the task and the time period, read by the configuration time-period estimating unit 12, for configuring a single circuit. Then, the configuration number determining unit 14 calculates an ideal task 1 parallel number or an ideal number of circuits 1 to be configured in the FPGA and determines the number of circuits 1 to be configured in the FPGA ((a) illustrated in FIG. 5). A symbol SQRT included in Equation (1) indicates a square root.

The ideal number of circuits=SQRT((the time period for executing the task by a single circuit)/(the time period for configuring a single circuit))     (1)

Equation (1) indicates that the number of circuits to be configured in the FPGA is determined so that a time period for configuring the circuits in the FPGA is nearly equal to a time period for executing the task. Equation (1) is obtained by transforming Equation (2). The ideal number calculated according to Equation (1) is, among considerable various task-parallel numbers, the number of circuits that minimizes the process time of the task that is a time period from the start of the configuration of the circuits in the FPGA to the completion of the execution of the task.

> The time period for configuring a single circuit×the task-parallel number=the time period for executing the task by a single circuit/the task-parallel number. (2)

In Equation (2), "the time period for configuring a single circuit×the task-parallel number" indicates a time period for configuring circuits in the FPGA. The time period for executing the task by a single circuit/the task-parallel number indicates a time period for executing the task by a predetermined number of circuits for executing the task in parallel. Equations (1) and (2) are established under conditions that the time period for configuring the circuits in the FPGA is proportional to the task-parallel number and that the time period for executing the task is inversely proportional to the task-parallel number. The following description assumes that the time period for configuring the circuits in the FPGA is proportional to the task-parallel number and that the time period for executing the task is inversely proportional to the task-parallel number.

The execution time-period estimating unit 10 divides the time period for executing the task 1 by a single circuit by the number of the circuits 1 (9 in this case), thereby calculating an estimated value of a time period for executing the task by the nine circuits 1 in parallel. The controlling unit 16 issues, to the DMAC, an instruction to transfer, from the HDD to the FPGA, circuit information on the circuits 1 whose number is equal to the ideal number calculated by the configuration number determining unit 14. For example, the controlling unit 16 provides the DMAC with top addresses (source addresses) at which the circuit information on the circuits 1 is stored in the HDD, top addresses (destination addresses) of blocks BLK in which the circuit information on the circuits 1 is written, and the data size of the circuit information on the circuits 1. The top addresses of the blocks BLK are different for the blocks BLK. The DMAC reads the circuit information on the circuits 1 from the HDD based on the instruction from the CPU, repeats an operation of transferring the read circuit information on the circuits 1 to the FPGA nine times, and sequentially configures the nine circuits 1 in the blocks BLK that are included in the FPGA and are different from each other.

Next, the configuration time-period estimating unit 12 reads, from the configuration time-period holding table 24, a time period (time period for configuring a single circuit) for transferring circuit information on circuits 2 from the HDD to the FPGA, based on the size of the circuit information on the circuits 2 and the rate of transferring data from the HDD to the FPGA. The configuration number determining unit 14 divides, by a time period for configuring a single circuit 2, the estimated value, calculated by the execution time-period estimating unit 10, of the time period for executing the task 1 by the nine circuits 1 in parallel, thereby calculating the number ("4") of circuits 2 to be configured, and determines the number of circuits 2 to be configured in the FPGA ((c) illustrated in FIG. 5). In this way, the initial value of the number of circuits to be configured to execute the succeeding task is determined so that the time period for configuring the circuits is nearly equal to the estimated value of the time period for executing the preceding task.

The execution time-period estimating unit 10 reads time periods (time periods for executing the task 2 by a single circuit) for executing the task 2 from the execution time-period holding table 22. The execution time-period estimating unit 10 calculates the average of the read time periods for executing the task 2 and treats the calculated average as an estimated value of the time period for executing the task 2 by a single circuit. The execution time-period estimating unit 10 divides the estimated value of the time period for executing the task 2 by a single circuit by the number ("4"), calculated by the configuration time-period estimating unit 12, of circuits 2 to be configured, thereby calculating an estimated value of a time period for executing the task 2 by the four circuits 2 in parallel.

Next, the controlling unit 16 activates an application program for executing the task 1, starts the task 1, and issues, to the DMAC, an instruction to transfer circuit information on the circuits 2 from the HDD to the FPGA. Then, the circuits 2 are configured in the FPGA in parallel with the execution of the task 1 ((d) illustrated in FIG. 5).

Next, the controlling unit 16 executes control of the adjustment of the number of circuits 2 to be configured in the FPGA, based on whether the completion time of the task 1 is earlier or later than a time when the configuration of circuits 2 in the FPGA is completed ((e) illustrated in FIG. 5). The application program for executing the task 1 is stopped based on the completion of the task 1. If the time period for executing the task 2 changes due to the execution of the task 1 or if dependence between the task 1 and the task 2 exists, the number of circuits 2 to be configured in the FPGA is adjusted based on the change in the time period for executing the task 2. Examples of the adjustment of the number of circuits 2 to be configured in the FPGA are described with reference to FIGS. 6 to 10.

After the execution of the task 1 is completed, the execution time-period estimating unit 10 multiplies the time period for executing the task 1 by the task 1 parallel number, thereby calculating a time period for executing the task 1 by a single circuit, and causes the calculated execution time-period to be stored in the execution time-period holding table 22. Before or after the completion of the execution of the task 1, the configuration of the circuits 2 in the FPGA is completed.

Next, the configuration time-period estimating unit 12 reads, from the configuration time-period holding table 24, a time period (time period for configuring a single circuit 3) for transferring circuit information on the circuits 3 from the HDD to the FPGA, based on the size of the circuit information on the circuits 3 and the rate of transferring data from the HDD to the FPGA. The configuration number determining unit 14 divides, by the time period for configuring the single circuit 3, the estimated value, calculated by the execution time-period estimating unit 12, of the time period for executing the task 2 by the four circuits in parallel, thereby calculating the number ("4") of the circuits 3 to be configured, and determines the number of the circuits 3 to be configured in the FPGA ((f) illustrated in FIG. 5).

The execution time-period estimating unit 10 reads time periods (time periods for executing the task 3 by a single circuit) for executing the task 3 from the execution time-period holding table 22. The execution time-period estimating unit 10 calculates the average of the read time periods for executing the task 3 and treats the calculated average as an estimated value of the time period for executing the task 3 by a single circuit. The execution time-period estimating unit 10 divides, by the number ("4"), calculated by the configuration time-period estimating unit 12, of the circuits 3 to be configured, the estimated value of the time period for executing the task 3 by a single circuit, thereby calculating an estimated value of a time period for executing the task 3 by the four circuits 3 in parallel.

Next, the controlling unit 16 activates an application program for executing the task 2 and issues, to the DMAC, an instruction to transfer circuit information on the circuits 3 from the HDD to the FPGA. Then, the configuration of the circuits 3 in the FPGA is executed in parallel with the execution of the task 2 ((g) illustrated in FIG. 5).

Next, the controlling unit 16 executes control of the adjustment of the number of circuits 3 to be configured in the FPGA, based on whether the completion time of the execution of the task 2 is earlier or later than the completion time of the configuration of the circuits 3 in the FPGA ((h) illustrated in FIG. 5). The application program for executing the task 2 is stopped based on the completion of the task 2. If the time period for executing the task 3 changes due to the execution of the task 2 or if dependence between the task 2 and the task 3 exists, the number of circuits 3 to be configured in the FPGA is adjusted based on the change in the time period for executing the task 3.

After the execution of the task 2 is completed, the execution time-period estimating unit 10 multiplies a time period for executing the task 2 by the task 2 parallel number, thereby calculating a time period for executing the task 2 by a single circuit, and causes the calculated time period to be stored in the execution time-period holding table 22. Before or after the completion of the execution of the task 2, the configuration of the circuits 3 in the FPGA is completed.

Next, the controlling unit 16 activates an application program for executing the task 3 and the execution of the task 3 is started. Since a task that is executed after the execution of the task 3 does not exist, the processing executed by the FPGA is completed based on the completion of the task 3 ((i) illustrated in FIG. 5). The application program for executing the task 3 is stopped based on the completion of the task 3.

Figure 6:
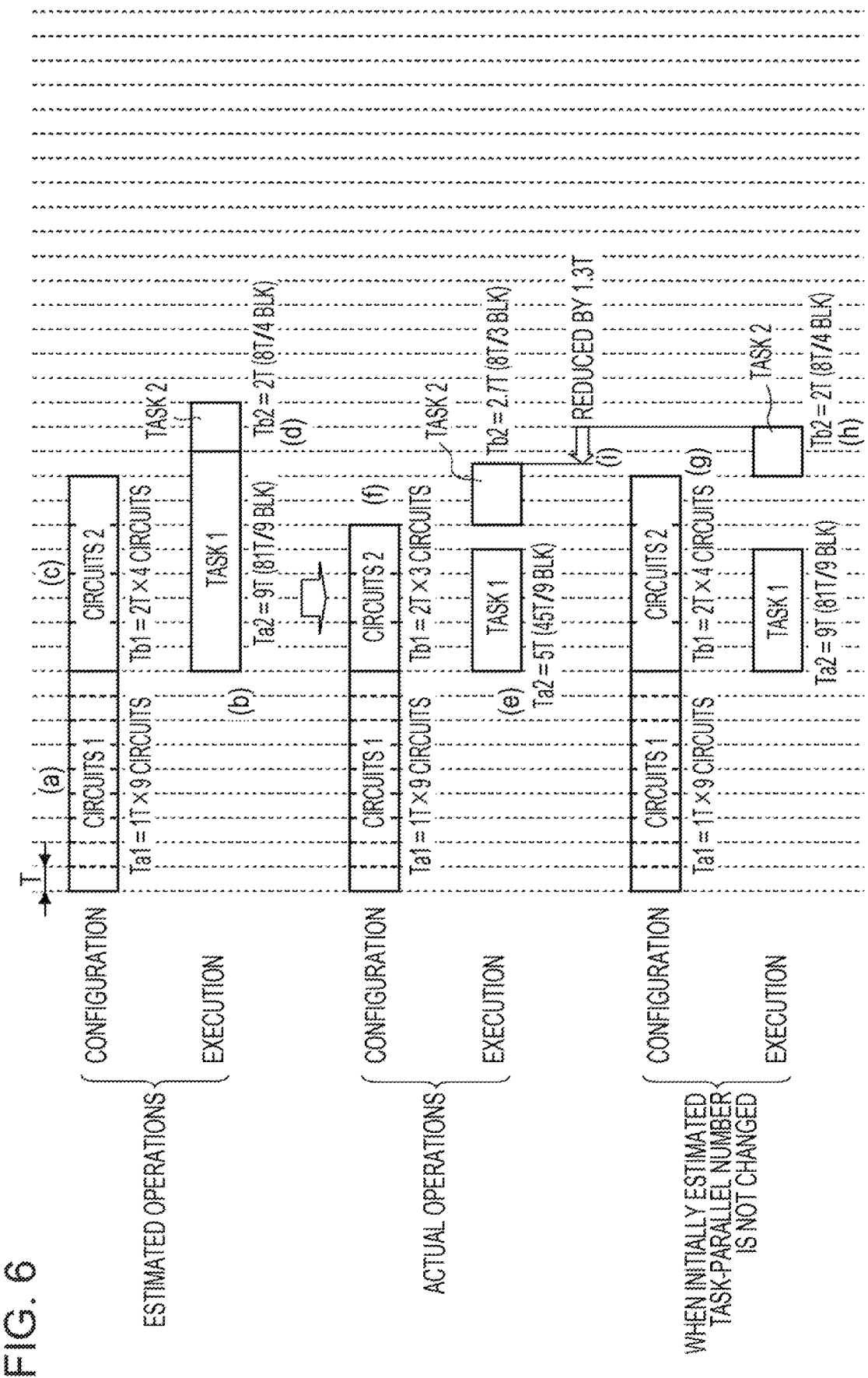
FIG. 6 is a diagram illustrating an example of operations of a server, according to an embodiment.

FIG. 6 illustrates an example of operations of the server SV2 illustrated in FIG. 3. In FIG. 6, after the nine circuits 1 are configured in the FPGA, the task 1 is executed by the circuits 1 in parallel with the configuration of the four circuits 2 in the FPGA. After the task 1 is completed, the task 2 is executed by the circuits 2. Operations illustrated in FIG. 6 are the same as or similar to the operations illustrated in FIG. 5, except that the configuration of the circuits 3 in the FPGA and the task 3 by the circuits 3 are not executed in the example illustrated in FIG. 6.

First, the CPU of the server SV2 references the configuration time-period holding table 24 and estimates that a time period for configuring a single circuit 1 in the FPGA is 1T. The CPU of the server SV2 references the execution time-period holding table 22 and estimates that a time period for executing the task 1 by a single circuit is 81T. A symbol T indicates a standard time-period in order to simplify the description. In the actual operations, the configuration of circuits and the tasks may not be executed at time intervals of T.

The CPU uses Equation (1) to calculate the ideal number ("9") (SQRT(81T/1BLK) of the circuits 1, and configures the nine circuits 1 in the FPGA ((a) illustrated in FIG. 6). In addition, the CPU estimates that a time period for executing the task 1 by the nine circuits 1 in parallel is 9T (=81T/9BLK) ((b) illustrated in FIG. 6).

The CPU references the configuration time-period holding table 24 and estimates that a time period for configuring a single circuit 2 in the FPGA is 2T. The CPU references the execution time-period holding table 22 and estimates that a time period for executing the task 2 by a single circuit is 8T. The CPU calculates the number of circuits 2 that are able to be configured during the time period 9T for executing the task 1 by the nine circuits 1 in parallel, and determines the configuration of the four circuits 2 in the FPGA ((c) illustrated in FIG. 6). In addition, the CPU estimates that a time period for executing the task 2 by the four circuits 2 in parallel is 2T (=8T/4BLK) ((d) illustrated in FIG. 6).

In the actual operations, the time period for executing the task 1 is shorter than the estimated time period and is 5T ((e) illustrated in FIG. 6). The CPU calculates, based on the execution time-period 5T, a time period 45T (5T×9BLK) for executing the task 1 by a single circuit 1, and causes the calculated execution time-period 45T to be stored in the execution time-period holding table 22. The CPU re-estimates the time period for executing the task 2, based on the completion of the task 1. This is due to the fact that, if dependence between the task 1 and the task 2 exists, the amount of processing to be executed by the task 2 may change depending on the result of the execution of the task 1, and the time period for executing the task 2 may change. In the example illustrated in FIG. 6, the dependence between the task 1 and the task 2 does not exist, and the time period for executing the task 2 by a single circuit 2 is equal to the initially estimated execution time-period (8T).

The CPU 1 uses Equation (1) to calculate an ideal number ("2") (SQRT(8T/2BLK) of circuits 2 and determines that the number of circuits 2 configured in the FPGA by the completion time of the task 1 is equal to or larger than the ideal number. Thus, the CPU configures, in the FPGA, circuits 2 up to the third circuit 2 whose circuit information is being transferred to the FPGA at the completion time of the task 1, that is, the three circuits 2 in total, and the task 2 parallel number becomes "3" ((f) illustrated in FIG. 6). The task 2 executed by the three circuits 2 in parallel is completed after 2.7T (=8T/3BLK). The CPU calculates, based on the execution time-period 2.7T, a time period 8T (2.7T×3BLK) for executing the task 2 by a single circuit, causes the calculated execution time-period 8T to be stored in the execution time-period holding table 22, and completes processing executed by the tasks 1 and 2.

In contrast, in a case where the initially estimated task 2 parallel number ("4") is not changed, an operation of configuring the circuits 2 is continued after the completion of the task 1 ((g) illustrated in FIG. 6). Then, after the four circuits 4 are configured in the FPGA, the CPU starts to execute the task 2. In this case, since the four circuits 2 executes the task 2 in parallel, a time period for executing the task 2 is 2T (8T/4BLK) ((h) illustrated in FIG. 6). Thus, as in the actual operations described above, when the task 2 parallel number is changed based on the completion time of the task 1, the completion time of the task 2 becomes earlier by 1.3T ((i) illustrated in FIG. 6), compared with the case where the task 2 parallel number is not changed.

As illustrated in FIG. 6, there may be a case where the execution of the preceding task is completed before the completion of the configuration of succeeding circuits for executing the succeeding task in the FPGA, and the number of the succeeding circuits that have been configured in the FPGA by the completion time of the preceding task already reaches the ideal number. In this case, when the succeeding task is executed by the succeeding circuits that have been configured in the FPGA by the completion time of the preceding task, the process time of the multiple tasks continuously executed may be reduced, compared with the case where the succeeding task is executed by circuits whose number is equal to the initially estimated task-parallel number. In other words, when a time period for executing the preceding task is reduced and the amount of processing executed by the succeeding task does not change, the total time-period for executing the tasks may be reduced by the reduction in the number of circuits configured to execute the succeeding task, compared with the case where the number of succeeding circuits to be configured is not changed.

Figure 7:
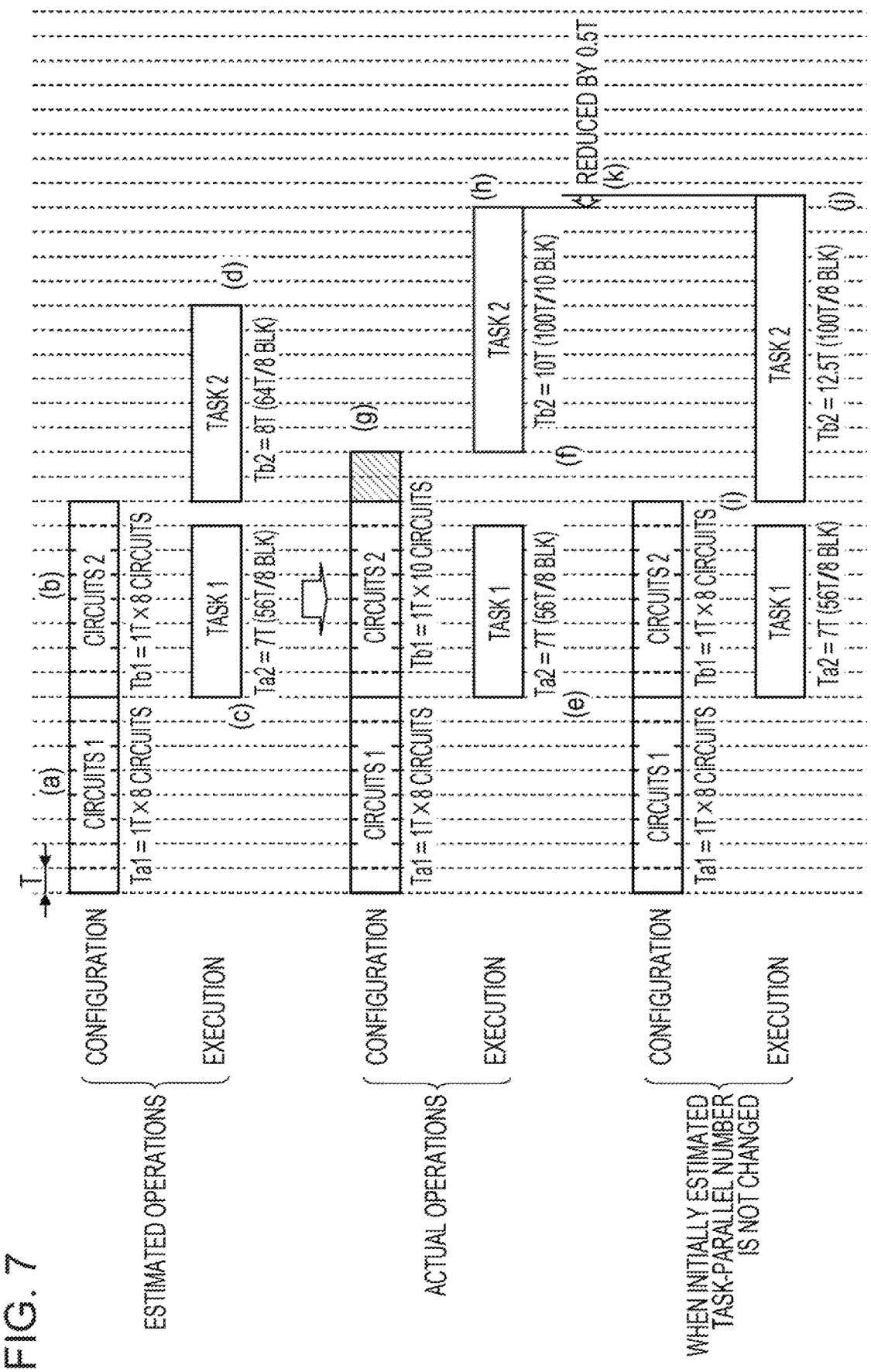
FIG. 7 is a diagram illustrating an example of operations of a server, according to an embodiment.

FIG. 7 illustrates another example of the operations of the server SV illustrated in FIG. 3. A detailed description of operations that are the same as or similar to those illustrated in FIG. 6 is omitted. In FIG. 7, a task 1, which is executed for a time period 56T when a single circuit executes the task 1, and a task 2, which is executed for a time period 64T when a single circuit executes the task 2, are sequentially executed. A time period for configuring each circuit 1 in the FPGA is 1T ((a) illustrated in FIG. 7), and a time period for configuring each circuit 2 in the FPGA is 2T ((b) illustrated in FIG. 7). The CPU estimates that a time period for executing the task 1 by eight circuits 1 in parallel is 7T (=56T/8BLK) ((c) illustrated in FIG. 7). The CPU estimates that a time period for executing the task 2 by eight circuits 2 in parallel is 8T (=64T/8BLK) ((d) illustrated in FIG. 7).

In the actual operations, the time period for executing the task 1 is 7T that is initially estimated ((e) illustrated in FIG. 7). Upon the completion of the task 1, the CPU estimates that the amount of processing to be executed by the task 2 increases due to dependence between the task 1 and the task 2 and that the time period for executing the task 2 by a single circuit increases from 64T to 100T ((f) illustrated in FIG. 7). For example, in a case where the number of times processing is executed by the task 2 is determined based on processing executed by the task 1, the amount of the processing to be executed by the task 2 changes depending on the result of the processing executed by the task 1. The number of the times processing is executed by the task 2 is the number of times a loop described in the application program for executing the task 2 is executed or the like.

The CPU uses Equation (1) to calculate an ideal number "10" (SQRT(100T/1BLK)) of circuits 2 and determines, at the completion time of the task 1, that the number of circuits 2 that have been configured in the FPGA is smaller than the ideal number. Thus, as indicated by a hatched region in FIG. 7, the CPU configures circuits 2 in the FPGA until the number of the circuits configured in the FPGA becomes equal to the ideal number "10" ((g) illustrated in FIG. 7). Then, after configuring ten circuits 2 in the FPGA, the CPU causes the ten circuits 2 to execute the task 2 in parallel. The task 2 is completed after 10T (=100T/10 BLK) ((h) illustrated in FIG. 7). The CPU calculates, based on the execution time-period 10T, a time period 100T (10T×10BLK) for executing the task 2 by a single circuit, causes the calculated execution time-period 100T to be stored in the execution time-period holding table 22, and completes the processing executed by the tasks 1 and 2.

In contrast, in a case where the initially estimated task 2 parallel number is not changed, the task 2 is executed after the configuration of eight circuits 2 in the FPGA ((i) illustrated in FIG. 7). In this case, the task 2 is executed by the eight circuits 2 in parallel, and the time period for executing the task 2 is 12.5T (100T/8BLK) ((j) illustrated in FIG. 7). Thus, as in the actual operation described above, when the task 2 parallel number is changed based on the completion time of the task 1 and the time period for executing the task 2 by a single circuit increases based on the processing executed by the task 1, the completion time of the task 2 becomes earlier by 0.5T ((k) illustrated in FIG. 7), compared with the case where the task 2 parallel number is not changed.

As illustrated in FIG. 7, there may be a case where the execution of the preceding task is completed before the completion of the configuration of the succeeding circuits for executing the succeeding task in the FPGA, the dependence between the preceding and succeeding tasks exists, and the number of succeeding circuits configured in the FPGA by the completion time of the preceding task does not reach the ideal number. In this case, the succeeding task is executed after the configuration of the ideal number of succeeding circuits, thereby reducing the process time of the multiple tasks continuously executed, compared with the case where the succeeding task is executed by succeeding circuits whose number is equal to the initially estimated task-parallel number. In other words, when the time period for executing the preceding task is reduced and the amount of processing executed by the succeeding task increases, the total time period for executing the tasks may be reduced by an increase in the number of circuits for executing the succeeding task, compared with the case where the number of circuits 2 is not changed.

Figure 8:
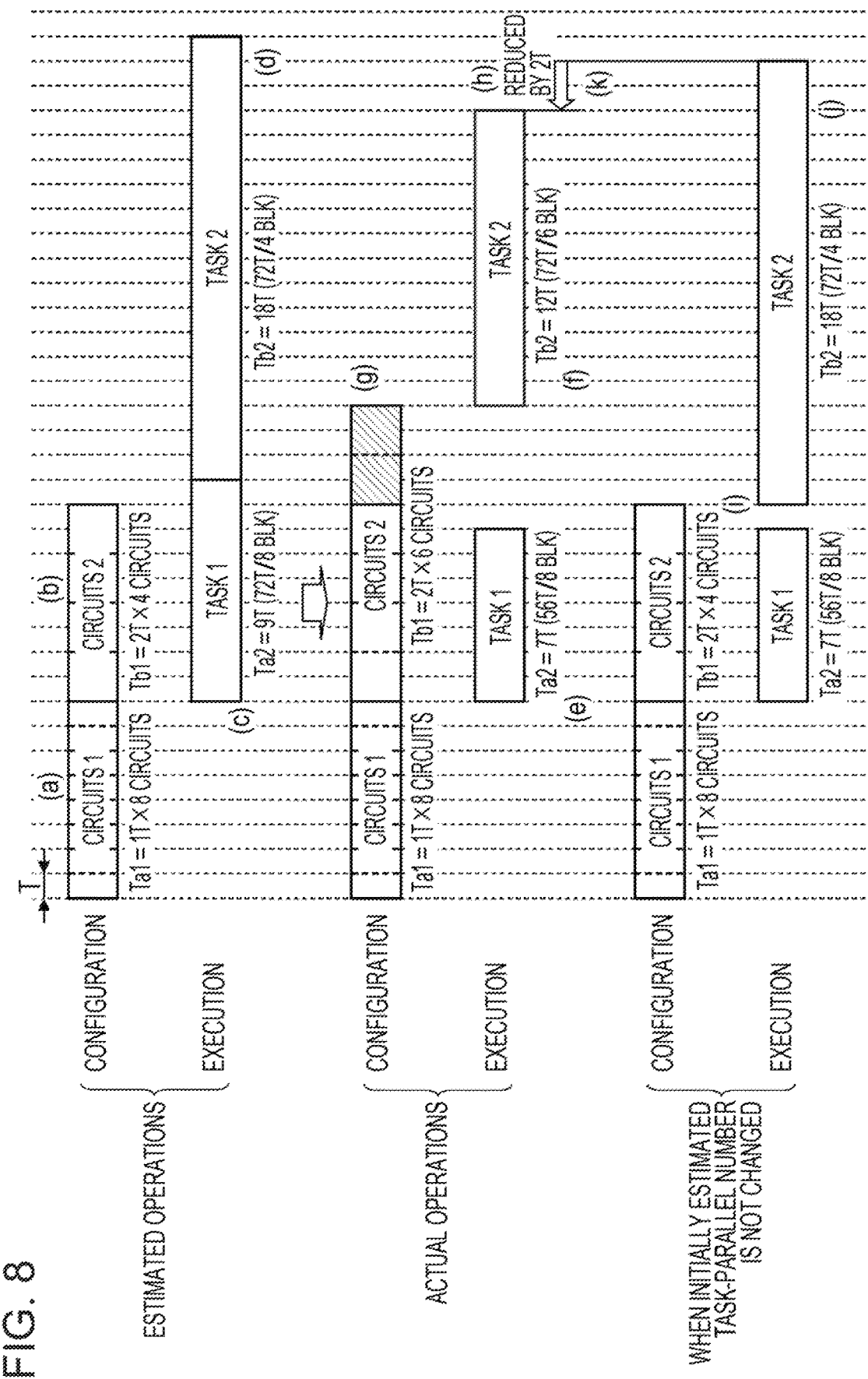
FIG. 8 is a diagram illustrating an example of operations of a server, according to an embodiment.

FIG. 8 illustrates another example of the operations of the server SV2 illustrated in FIG. 3. A detailed description of operations that are the same as or similar to those described with reference to FIGS. 6 and 7 is omitted. In FIG. 8, a task 1, which is executed for a time period 72T when a single circuit executes the task 1, and a task 2, which is executed for a time period 72T when a single circuit executes the task 2, are sequentially executed. A time period for configuring each circuit 1 in the FPGA is 1T ((a) illustrated in FIG. 8), and a time period for configuring each circuit 2 in the FPGA is 2T ((b) illustrated in FIG. 8). The CPU estimates that a time period for executing the task 1 by eight circuits 1 in parallel is 9T (=72T/8BLK) ((c) illustrated in FIG. 8). The CPU estimates that a time period for executing the task 2 by four circuits 2 in parallel is 18T (=72T/4BLK) ((d) illustrated in FIG. 8).

In the actual operations, a time period for executing the task 1 is 7T that is shorter than the initially estimated value ((e) illustrated in FIG. 8). The CPU uses Equation (1) to calculate an ideal number "6" (SQRT (=72T/2BLK) of circuits 2, and determines, at the completion time of the task 1, that the number of circuits 2 configured in the FPGA is smaller than the ideal number. Thus, as indicated by a hatched region in FIG. 8, the CPU configures circuits 2 in the FPGA until the number of the circuits configured in the FPGA becomes equal to the ideal number "6" ((g) illustrated in FIG. 8). Then, after configuring six circuits 2 in the FPGA, the CPU causes the six circuits 2 to execute the task 2 in parallel. The task 2 is completed after 12T (=72T/6BLK) ((h) illustrated in FIG. 8). The CPU calculates, based on the execution time-period 72T, a time period 72T (=12T×6BLK) for executing the task 2 by a single circuit, causes the calculated execution time period 72T to be stored in the execution time-period holding table 22, and completes processing executed by the tasks 1 and 2.

In contrast, in a case where the initially estimated number "4" is not changed, the task 2 is executed after the configuration of the four circuits 2 in the FPGA ((i) illustrated in FIG. 8). In this case, the task 2 is executed by the four circuits 2 in parallel, and the time period for executing the task 2 becomes 18T (72T/4BLK) ((J) illustrated in FIG. 8). Thus, as in the actual operations, when the task 2 parallel number is changed based on the completion time of the task 1 and dependence between the task 1 and the task 2 does not exist, the completion time of the task 2 may become earlier by 2T ((k) illustrated in FIG. 8), compared with the case where the task 2 parallel number is not changed.

As illustrated in FIG. 8, there may be a case where the preceding task is completed before the completion of the configuration of succeeding circuits for executing the succeeding task in the FPGA, the dependence between the preceding and succeeding tasks does not exist, and the number of succeeding circuits that have been configured in the FPGA does not reach the ideal number. In this case, when the succeeding task is executed after the configuration of the ideal number of succeeding circuits, the process time of the multiple tasks continuously executed may be reduced, compared with the case where the succeeding task is executed by circuits whose number is equal to the initially estimated number. In other words, when the time period for executing the preceding task is reduced and the amount of processing executed by the succeeding task does not change, the total time period for executing the tasks may be reduced by an increase in the number of circuits to be configured to execute the succeeding task, compared with the case where the number of circuits to be configured is not changed.

Figure 9:
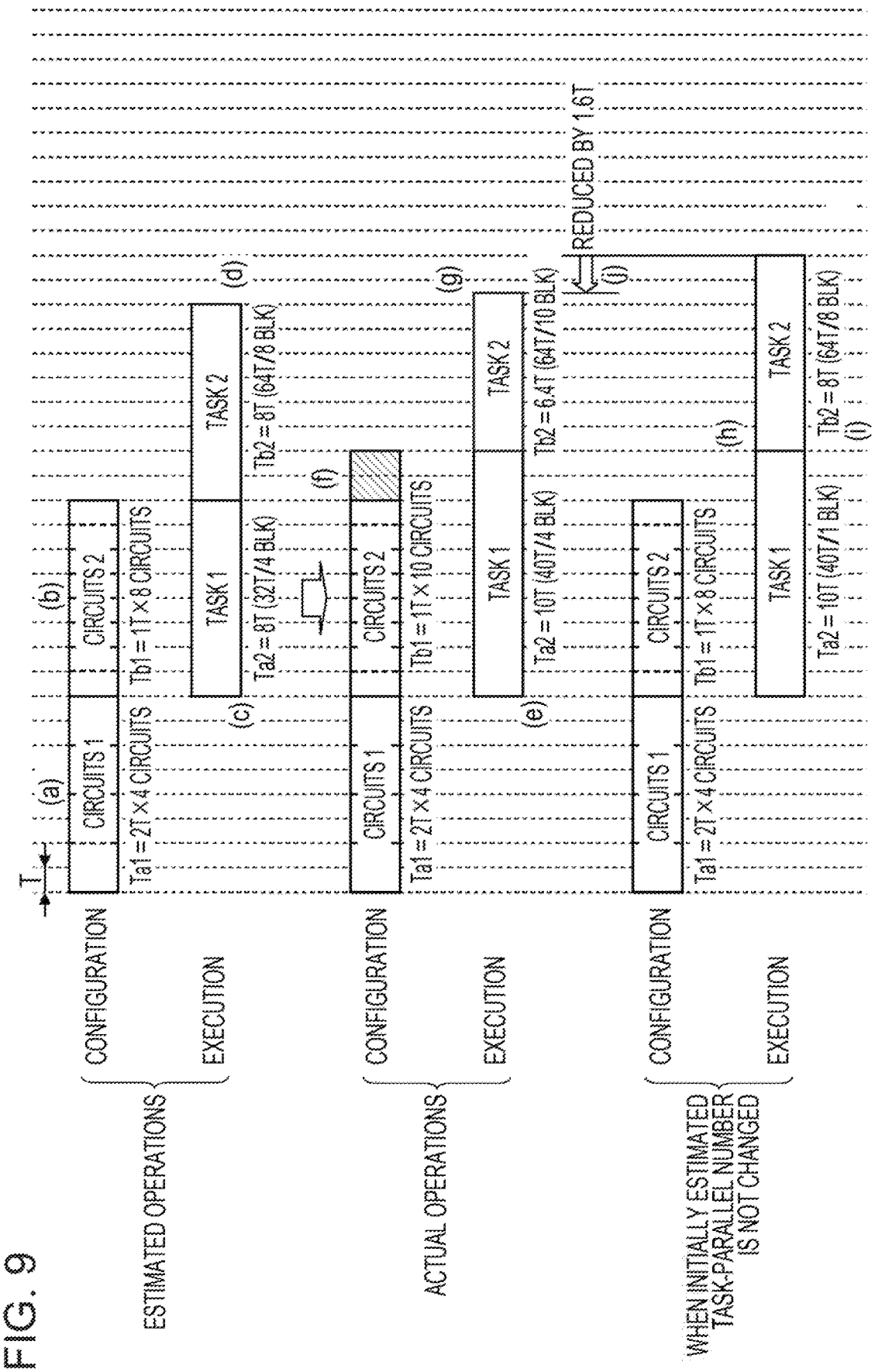
FIG. 9 is a diagram illustrating an example of operations of a server, according to an embodiment.

FIG. 9 illustrates another example of the operations of the server SV2 illustrated in FIG. 3. A detailed description of operations that are the same as or similar to those described with reference to FIG. 6 is omitted. In FIG. 9, a task 1, which is executed for a time period 32T when a single circuit executes the task 1, and the task 2, which is executed for a time period 64T when a single circuit executes the task 2, are sequentially executed. A time period for executing the task 1 by each circuit 1 is 2T ((a) illustrated in FIG. 9), and a time period for executing the task 2 by each circuit 2 is 1T ((b) illustrated in FIG. 9). The CPU estimates that a time period for executing the task 1 by four circuits 1 in parallel is 8T (=32T/4BLK) ((c) illustrated in FIG. 9). The CPU estimates that a time period for executing the task 2 by eight circuits 2 in parallel is 8T (=64T/8BLK) ((d) illustrated in FIG. 9).

In the actual operations, the time period for executing the task 1 becomes longer than the initially estimated time period, and the task 1 is continuously executed even after the configuration of the eight circuits 2 in the FPGA. The CPU re-estimates the time period for executing the task 1 and calculates 10T as the time period for executing the task 1 ((e) illustrated in FIG. 9). For example, the CPU re-estimates, at the completion time of the configuration of the eight circuits 2 in the FPGA, a time period for executing the task 1, based on the ratio of the partial amount of processing executed by a completed part of the task 1 to the entire amount of processing executed by the task 1. When the entire amount of the processing executed by the task 1 is "100" and the partial amount of the processing that has been executed by the completed part of the task 1 by the completion time of the configuration of the eight circuits 2 in the FPGA is "80", the time period for completely executing the task 1 is calculated as (100/80)×(a time period for executing the task 1 until the completion of the configuration of the eight circuits 2 in the FPGA).

The CPU calculates the number of circuits 2 (10) that are able to be configured during the time period 10T for executing the task 1 ((f) illustrated in FIG. 9). Since dependence between the task 1 and the task 2 does not exist, the time period for executing the task 2 by a single circuit is equal to the initially estimated time period or 64T. The CPU uses Equation (1) to calculate an ideal number (SQRT(64T/1BLK)) of circuits 2, "8", and determines that the number of circuits 2 configured in the FPGA by the completion time of the task 1 is larger than the ideal number. Thus, as indicated by a hatched region in FIG. 9, the CPU configures in the FPGA, by the completion time of the task 1, circuits 2 indicated in circuit information that is currently being transferred to the FPGA, and the task 2 parallel number becomes "10". The task 2 executed by the ten circuits 2 in parallel is completed after 6.4T (=64T/10BLK) ((g) illustrated in FIG. 9). The CPU calculates, based on the execution time-period 6.4T, a time period 64T (6.4T×10BLK) for executing the task 2 by a single circuit, causes the calculated execution period 64T to be stored in the execution time-period holding table 22, and completes processing executed by the tasks 1 and 2.

On the other hand, in a case where the initially estimated task 2 parallel number "8" is not changed, the task 2 is executed after the completion of the task 1 ((h) illustrated in FIG. 9). In this case, since the task 2 is executed by the eight circuits in parallel, the time period for executing the task 2 is 8T (64T/8BLK) ((i) illustrated in FIG. 9). Thus, as in the actual operations described above, when the task 2 parallel number is changed based on the completion time of the task 1, the completion time of the task 2 becomes earlier by 1.6T, compared with the case where the number of circuits for executing the task 2 is not changed.

As illustrated in FIG. 9, there may be a case where the configuration of succeeding circuits for executing the succeeding task in the FPGA may be completed before the completion of the preceding task, and succeeding circuits whose number is equal to or larger than the ideal number are able to be configured in the FPGA by the re-estimated completion time of the preceding task. In this case, when the succeeding circuits are configured until the completion of the preceding task and the succeeding task is executed by the configured succeeding circuits, the process time of the multiple tasks continuously executed may be reduced, compared with the case where the succeeding task is executed by succeeding circuits whose number is equal to the initially estimated number. In other words, when the completion time of the preceding task becomes late, the amount of processing to be executed by the succeeding task does not change, and the number of succeeding circuits to be configured is able to be increased by the completion of the preceding task, the total time period for executing the tasks may be reduced, compared with the case where the number of succeeding circuits to be configured is not changed.

In the actual operations illustrated in FIG. 9, if the task 1 is completed slightly after the completion of the configuration of the circuits 2 (for example, if the time period for executing the task 1 is 10.2T), the number of circuits 2 that are able to be configured during the execution of the task 1 is equal to the initially estimated number or 8. In this case, the server SV2 operates in a manner that is the same as or similar to the estimated operations illustrated in FIG. 9.

Figure 10:
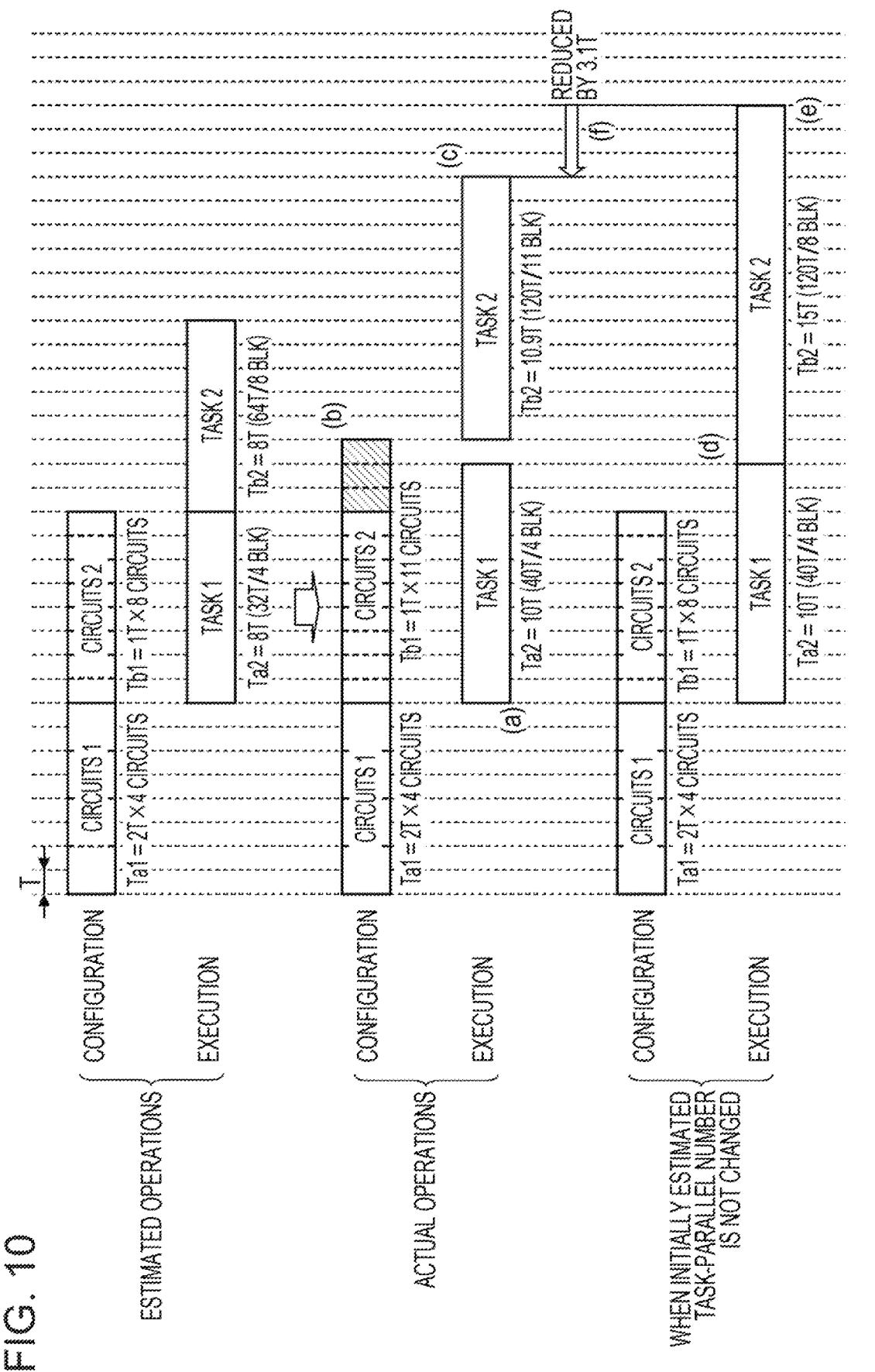
FIG. 10 is a diagram illustrating an example of operations of a server, according to an embodiment.

FIG. 10 illustrates another example of the operations of the server SV2 illustrated in FIG. 3. A detailed description of operations that are the same as or similar to those illustrated in FIGS. 6 and 9 is omitted. Estimated operations illustrated in FIG. 10 are the same as those illustrated in FIG. 9.

In the actual operations, a time period for executing the task 1 becomes longer than the initially estimated time period, and the task 1 is continuously executed even after the configuration of the eight circuits 2 in the FPGA. The CPU re-estimates the time period for executing the task 1 and calculates 10T as the execution time-period ((a) illustrated in FIG. 10). The CPU calculates the number (10) of circuits that are able to be configured during the time period 10T for executing the task 1. In the example illustrated in FIG. 10, the dependence between the task 1 and the task 2 exists, and a time period for executing the task 2 by a single circuit is longer than the initially estimated time period and is 120T.

The CPU uses Equation (1) to calculates an ideal number (SQRT(120T/1BLK) of circuits 2, "11", and determines, at the completion of the task 1, that the number of circuits 2 ("10") to be configured in the FPGA is smaller than the ideal number. Thus, as indicated by a hatched region in FIG. 10, the CPU configures circuits 2 even after the completion of the task 1 so that the task 2 parallel number becomes "11" ((b) illustrated in FIG. 10). The task 2 executed by the eleven circuits in parallel is completed after 10.9T (=120T/11BLK) ((c) illustrated in FIG. 10). The CPU calculates, based on the execution time-period 10.9T, a time period 119.9T (=10.9T× 11BLK) for executing the task 2 by a single circuit, causes the calculated execution time-period 119.9T to be stored in the execution time-period holding table 22, and completes the processing executed by the tasks 1 and 2.

In contrast, if the initially estimated task 2 parallel number "8" is not changed, the task 2 is executed after the completion of the task 1 ((d) illustrated in FIG. 10). In this case, the task 2 is executed by eight circuits 2 in parallel, and the time period for executing the task 2 is 15T (120T/8BLK) ((e) illustrated in FIG. 10). Thus, as in the actual operations described above, when the task 2 parallel number is changed based on the completion time of the task 1, the completion time of the task 2 may become earlier by 3.1T, compared with the case where the task 2 parallel number is not changed ((f) illustrated in FIG. 10).

As illustrated in FIG. 10, there may be a case where the configuration of succeeding circuits for executing the succeeding task in the FPGA is completed before the completion of the preceding task, and an ideal number of succeeding circuits are not configured by the re-estimated completion time of the preceding task. In this case, when the succeeding circuits are configured, after the completion of the preceding task, until the number of the configured succeeding circuits becomes equal to the ideal number, and the succeeding task is executed by the configured succeeding circuits, the process time of the multiple tasks continuously executed may be reduced, compared with the case where the succeeding task is executed in parallel by circuits whose number is equal to the initially estimated number. In other words, when the completion time of the preceding task becomes late and the amount of processing to be executed by the succeeding task increases, succeeding circuits are configured until the number of the configured succeeding circuits becomes equal to the ideal number, thereby reducing the total time period for executing the tasks, compared with the case where the number of circuits to be configured is not changed.

Figure 11:
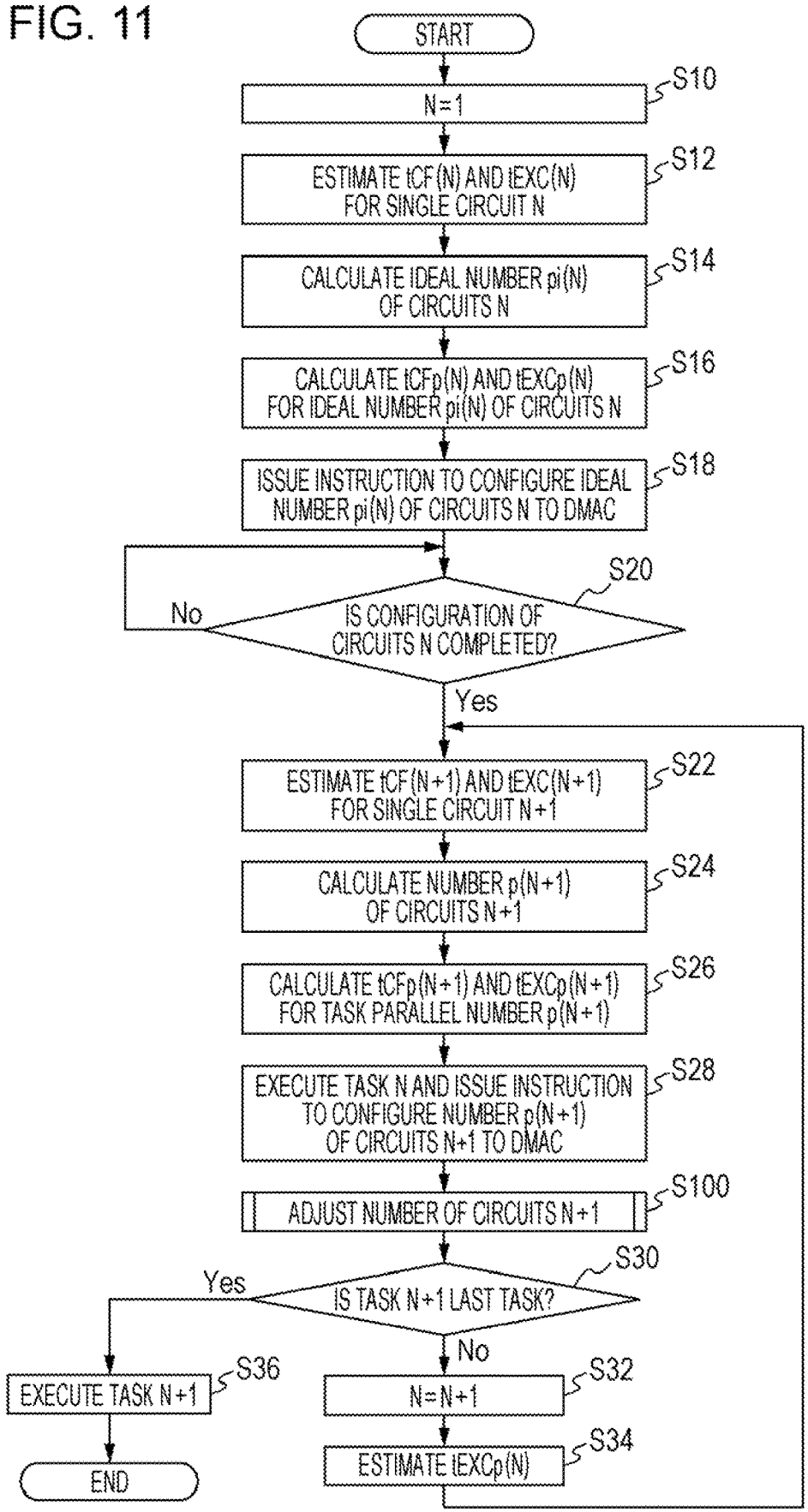
FIG. 11 is a diagram illustrating an example of an operational flowchart for optimizing a process time of a task on a server, according to an embodiment.

FIG. 11 illustrates an example of operations for optimizing the process time of a task on the server SV2 illustrated in FIG. 3. A process illustrated in FIG. 11 is achieved by causing the CPU of the server SV2 to execute the control program. FIG. 11 illustrates an example of the process executed by the method and program for controlling the information processing device.

First, in step S10, the controlling unit 16 sets a variable N at "1". In step S12, the configuration time-period estimating unit 12 estimates a time period tCF(N) for configuring a single circuit N in the FPGA. For example, the circuit N corresponds to a circuit 1 illustrated in FIG. 5. The execution time-period estimating unit 10 estimates a time period tEXC(N) for executing a task N by the single circuit N. In this case, the configuration time-period estimating unit 12 estimates the configuration time period tCF(N) by referencing the configuration time-period holding table 24, and the execution time-period estimating unit 10 estimates the execution time period tEXC(N) by referencing the execution time-period holding table 22.

Next, in step S14, the configuration number determining unit 14 uses Equation (1) to calculate an ideal number pi(N) of circuits N to be configured. In step S16, the configuration time-period estimating unit 12 calculates a time period tCFp(N) for configuring the ideal number pi(N) of circuits N in the FPGA. The execution time-period estimating unit 10 calculates a time period tEXCp(N) for executing the task N by the ideal number pi(N) of circuits N.

Next, in step S18, the controlling unit 16 issues, to the DMAC, an instruction to transfer circuit information on the circuits N from the HDD to the FPGA in order to configure the ideal number pi(N) of circuits N in the FPGA. The DMAC sequentially transfers the circuit information on the ideal number pi(N) of circuits N from the HDD to the FPGA. The controlling unit 16 or another function of the CPU may transfer the circuit information on the circuits N from the HDD to the FPGA, instead of the DMAC.

Next, in step S20, the controlling unit 16 stands by until the ideal number pi(N) of circuits N are configured in the FPGA. When the ideal number pi(N) of circuits N are configured in the FPGA, the process proceeds to step S22.

In step S22, the configuration time-period estimating unit 12 estimates a time period tCF(N+1) for configuring a single circuit N+1 in the FPGA. For example, the circuit N+1 corresponds to a circuit 2 illustrated in FIG. 5. The execution time-period estimating unit 10 estimates a time period tEXC(N+1) for executing a task N+1 by the single circuit N+1. In this case, the configuration time-period estimating unit 12 estimates the configuration time-period tCF(N+1) by referencing the configuration time-period holding table 24, and the execution time-period estimating unit 10 estimates the execution time-period tEXC(N+1) by referencing the execution time-period holding table 22.

Next, in step S24, the configuration number determining unit 14 calculates the number of circuits N+1 that are able to be configured during the time period for executing the task N by the ideal number pi(N) of circuits N, and determines the calculated number to be a task N+1 parallel number p(N+1). Here, the task N+1 parallel number p(N+1) is not necessarily equal to the ideal number pi(N+1).

Next, in step S26, the configuration time-period estimating unit 12 calculates a time period tCFp(N+1) for configuring the number p(N+1) of circuits N+1 in the FPGA. The execution time-period estimating unit 10 calculates a time period tEXCp(N+1) for executing the task N+1 by the circuits N+1 whose number is the task N+1 parallel number p(N+1).

Next, in step S28, the controlling unit 16 causes the ideal number pi(N) of circuits N to execute the task N. In addition, the controlling unit 16 issues, to the DMAC, an instruction to transfer circuit information on the circuits N+1 from the HDD to the FPGA in order to configure the number p(N+1) of circuits N+1 in the FPGA. The DMAC sequentially transfers, from the HDD to the FPGA, the circuit information on the circuits N+1 whose number is equal to the task-parallel number p(N+1). The controlling unit 16 or another function of the CPU may transfer the circuit information on the circuits N+1 from the HDD to the FPGA, instead of the DMAC. In this case, the controlling unit 16 or the other function of the CPU functions as the configuration controlling unit for sequentially configuring a predetermined number of succeeding circuits in the FPGA during the execution of the preceding task.

In step S100, the controlling unit 16 executes control of the adjustment of the number (or the task-parallel number p(N+1)) of circuits N+1 to be configured in the FPGA, based on whether the completion time of the task N is earlier or later than the completion time of the configuration of the circuits N+1 in the FPGA. An example of step S100 is illustrated in FIG. 12.

After the completion of the process of step S100, in step S30, the controlling unit 16 determines whether or not the task N+1 executed by the circuits N+1 is the last task among a series of tasks to be continuously executed. When the task N+1 is not the last task, the process proceeds to step S32. When the task N+1 is the last task, the process proceeds to step S36.

In step S32, the controlling unit 16 increments the variable N by "1". By incrementing the variable N, the task N+1 (succeeding task) is treated as a task N (preceding task), and the circuits N+1 (succeeding circuits) are treated as circuits N (preceding circuits). In step S34, the execution time-period estimating unit 10 estimates a time period tEXCp(N) for executing the task N by the circuits N (circuits N+1 before the adjustment) whose number has been adjusted in step S100. Then, the process proceeds to step S22. In step S36, the controlling unit 16 causes the circuits N+1 to execute the task N+1 and completes processing by the series of tasks continuously executed.

Figure 12:
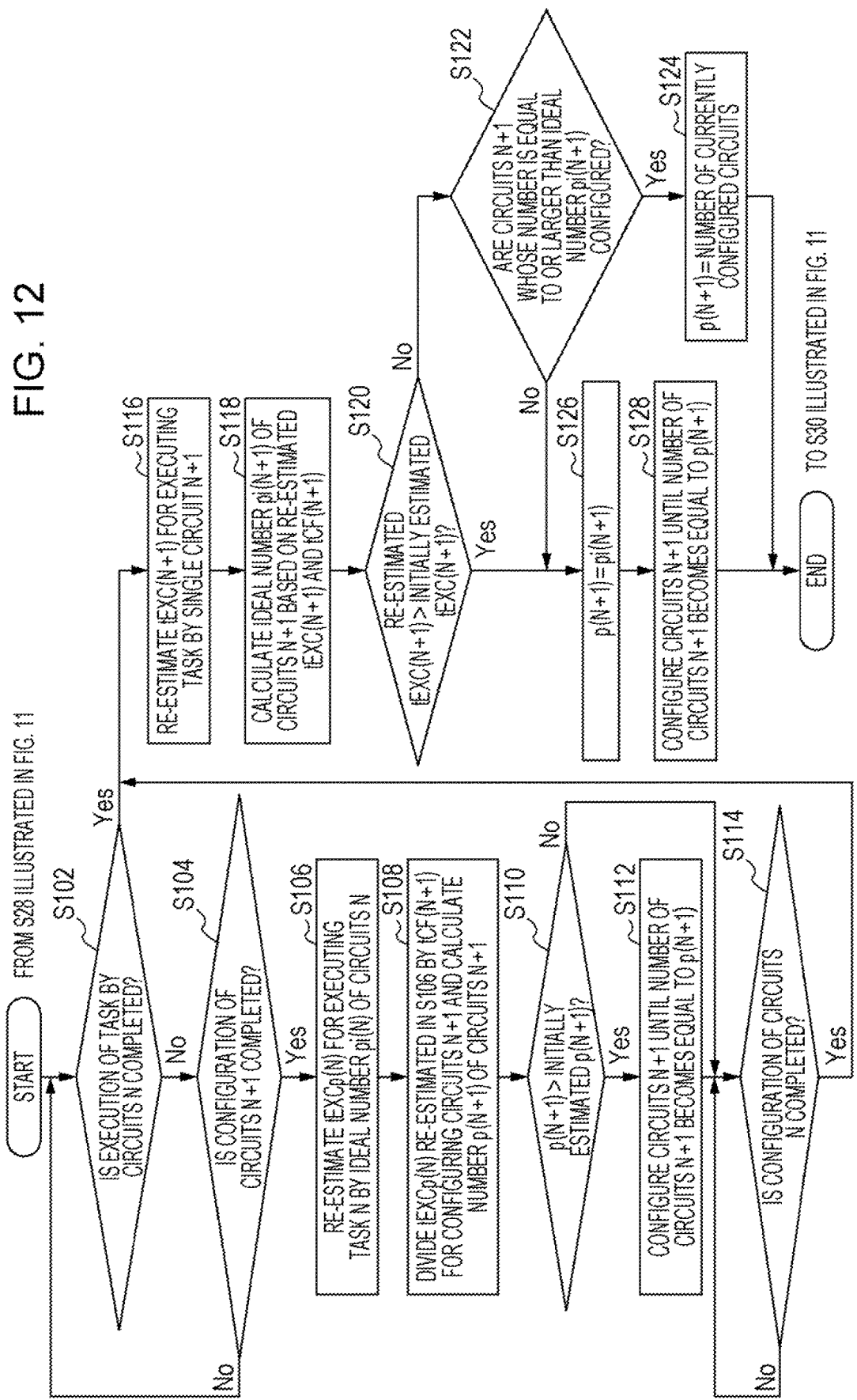
FIG. 12 is a diagram illustrating an example of an operational flowchart for optimizing a process time of a task on a server, according to an embodiment.

FIG. 12 illustrates the example of the process of step S100 illustrated in FIG. 11. In step S102, the controlling unit 16 determines whether or not the execution of the task N has been completed. When the execution of the task N has not been completed, the process proceeds to step S104. When the execution of the task N has been completed, the process proceeds to step S116.

In step S104, the controlling unit 16 determines whether or not the configuration of the circuits N+1 in the FPGA has been completed. When the configuration of the circuits N+1 in the FPGA has been completed, the process proceeds to step S106. When the configuration of the circuits N+1 in the FPGA has not been completed, the process returns to step S102. In other words, when the task N has been completed before the completion of the configuration of the circuits N+1 in the FPGA in step S102 or S104, the process proceeds to step S116. When the completion of the configuration of the circuits N+1 in the FPGA has been completed before the completion of the task N in step S102 or S104, the process proceeds to step S106.

In step S106, the execution time-period estimating unit 10 re-estimates the time period tEXCp(N) for executing the task N by the circuits N whose number is equal to the number pi(N). Next, in step S108, the configuration number determining unit 14 divides the time period tEXCp(N), estimated in step S106, for executing the task N by the time period tCF(N+1) for configuring the circuits N+1 and recalculates the task-parallel number p(N+1) or the number p(N+1) of circuits N+1 for executing the task N+1 in parallel.

In step S110, the controlling unit 16 determines whether or not the task-parallel number p(N+1) calculated in step S108 is larger than the task-parallel number p(N+1) initially calculated in step S24. When the task-parallel number p(N+1) calculated in step S108 is larger than the task-parallel number p(N+1) initially calculated in step S24 illustrated in FIG. 11, the process proceeds to step S112 in order to add circuit N+1 to the FPGA. When the task-parallel number p(N+1) calculated in step S108 is equal to or smaller than the task-parallel number p(N+1) initially calculated in step S24 illustrated in FIG. 11, the process proceeds to step S114 in order to avoid adding circuit N+1 to the FPGA. For example, when the task N is completed slightly after the completion of the configuration of the circuits N+1, and dependence between the task N and the task N+1 does not exist, the task-parallel number p(N+1) calculated in step S108 is equal to the task-parallel number p(N+1) initially calculated in step S24 illustrated in FIG. 11. In this case, the process proceeds to step S114.

In step S112, the controlling unit 16 configures circuits N+1 in the FPGA until the number of the circuits N+1 configured in the FPGA becomes equal to the number p(N+1). In step S114, the controlling unit 16 stands by until the number p(N+1) of circuits N+1 are configured in the FPGA. When the number p(N+1) of circuits N+1 are configured in the FPGA, the process proceeds to step S116.

In step S116, the execution time-period estimating unit 10 re-estimates the time period tEXC(N+1) for executing the task N+1 by a single circuit. Thus, even if the dependence between the task N and the task N+1 exists and the amount of processing to be executed by the task N+1 changes depending on the result of executing the task N, an accurate time period for executing the task N+1 may be estimated based on the result of executing the task N.

Next, in step S118, the configuration number determining unit 14 substitutes the time period tEXC(N+1) for executing the task N+1 by a single circuit and the time period tCF(N+1) for configuring a single circuit N+1 into Equation (1), and calculates an ideal task N+1 parallel number pi(N+1). The value estimated in step S116 is used as the time period tEXC(N+1) for executing the task N+1 by a single circuit, and the value estimated in step S22 illustrated in FIG. 11 is used as the time period tCF(N+1) for configuring a single circuit N+1 in the FPGA. Even if the dependence between the task N and the task N+1 exists and the amount of processing to be executed by the task N+1 changes depending on the result of executing the task N, the ideal number pi(N+1) may be calculated according to Equation (1) by using the execution time-period tEXC(N+1) estimated in step S116.

Next, in step S120, the controlling unit 16 determines whether or not the time period tEXC(N+1), calculated in step S116, for executing the task N+1 by a single circuit is longer than the execution time-period tEXC(N+1) initially estimated in step S22. When the dependence between the task N and the task N+1 exists, the execution time-period tEXC(N+1) is different from the execution time-period tEXC(N+1) initially estimated. When the execution time-period tEXC(N+1) calculated in step S116 is longer than the execution time-period tEXC(N+1) initially estimated in step S22 illustrated in FIG. 11, the process proceeds to step S126 in order to configure the ideal number pi(N+1) of circuits N+1. When the execution time-period tEXC(N+1) calculated in step S116 is equal to or shorter than the execution time-period tEXC(N+1) initially estimated in step S22 illustrated in FIG. 11, the process proceeds to step S122.

In step S122, the controlling unit 16 determines whether or not circuits N+1 whose number is equal to or larger than the ideal number pi(N+1) have been configured in the FPGA. When the circuits N+1 whose number is equal to or larger than the ideal number pi(N+1) have been configured in the FPGA, the configuration of the circuits N+1 in the FPGA is already completed and the process proceeds to step S124. When the circuits N+1 whose number is equal to or larger than the ideal number pi(N+1) have not been configured in the FPGA, the process proceeds to step S126 in order to configure, in the FPGA, the circuits N+1 whose number is equal to the ideal number pi(N+1).

In step S124, the controlling unit 16 determines the number of the circuits N+1 that have been configured until now in the FPGA, to be the task-parallel number p(N+1). Then, the process proceeds to step S30. In step S126, the controlling unit 16 determines the ideal number pi(N+1) calculated in step S118 to be the task N+1 parallel number p(N+1). Next, in step S128, the controlling unit 16 configures circuits N+1 in the FPGA until the number of the circuits N+1 configured in the FPGA becomes equal to the task-parallel number p(N+1). Then, the process proceeds to step S30 illustrated in FIG. 11.

In the embodiments described with reference to FIGS. 3 to 12, effects, which are the same as or similar to those for the embodiments described with reference to FIGS. 1 and 2, may be obtained. The total process time of tasks may be reduced for the information processing device that sequentially executes the tasks while configuring the succeeding circuits in the FPGA in the background of the execution of a preceding task, compared with conventional techniques. In other words, the number of circuits for executing a succeeding task may be reduced to a number smaller than an initially calculated number of circuits to be configured, and a total time period for executing the tasks may be reduced, compared with a case where the number of circuits to be configured is not changed from the initially calculated number of circuits to be configured. In addition, the number of circuits for executing the succeeding task is increased from the initially calculated number of circuits to be configured, and the total time period for executing the tasks may be reduced, compared with the case where the number of circuits to be configured is not changed from the initially calculated number of circuits to be configured.

In the embodiments described with reference to FIGS. 3 to 12, in a case where the time period for executing the preceding task is reduced and the amount of processing executed by the succeeding task increases, the number of circuits for executing the succeeding task is increased and the total time period for executing the tasks may be reduced, compared with the case where the number of circuits to be configured is not changed. In a case where the time period for executing the preceding task is reduced and the amount of the processing executed by the succeeding task does not change, the number of circuits for executing the succeeding task is increased and the total time period for executing the tasks may be reduced, compared with the case where the number of circuits to be configured is not changed. In a case where the completion time of the preceding task becomes late, the amount of the processing executed by the succeeding task does not change, and the number of succeeding circuits is able to be increased by the completion of the preceding task, the total time period for executing the tasks may be reduced, compared with the case where the number of circuits to be configured is not changed. In a case where the completion time of the preceding task becomes late and the amount of the processing executed by the succeeding task increases, succeeding circuits are configured until the number of the configured succeeding circuits becomes equal to the ideal number, thereby reducing the total time period for executing the tasks, compared with the case where the number of circuits to be configured is not changed.

The configuration number determining unit 14 calculates the ideal number pi(N+1) by using the time period tEXC(N+1), estimated by the execution time-period estimating unit 10, for executing the task N+1 by a single circuit. Thus, even if the dependence between the task N and the task N+1 exists and the amount of the processing executed by the task N+1 changes depending on the result of executing the task N, the ideal number pi(N+1) may be calculated according to Equation (1).

The configuration time-period estimating unit 12 calculates a time period for transferring circuit information. Thus, even if the rate of transferring data in the transfer path such as the bus BUS for transferring the circuit information changes, the time period for transferring the circuit information may be accurately estimated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a programmable circuit configured to configure circuits for executing tasks; and
a processor configured to:
estimate an execution time-period required for executing a first task by first circuits configured in the programmable circuit,
determine a first configuration number indicating a number of second circuits that are to be configured, in the programmable circuit, for executing a second task to be executed after the first task, based on the estimated execution time-period and a configuration time-period required for configuring the first configuration number of the second circuits in the programmable circuit,
cause the programmable circuit to configure, during execution of the first task, the first configuration number of the second circuits, and
adjust the number of second circuits that are to be configured during execution of the first task, based on a relationship between a time at which the first task is completed and a time at which configuration of the second circuits in the programmable circuit is completed, wherein
the processor determines a second configuration number indicating a number of the second circuits for which a total time period from a start time at which configuration of the second circuits in the programmable circuit is started to an end time at which execution of the second task by the second circuits is completed is reduced; and
in a case where the first task is completed before configuration of the first configuration number of the second circuits in the programmable circuit is completed, the processor:
causes the programmable circuit to stop configuration of a new circuit for the second circuits when a third configuration number indicating a number of the second circuits that are configured in the programmable circuit until completion of the first task is equal to or greater than the second configuration number, and
causes the programmable circuit to configure the second configuration number of the second circuits in the programmable circuit when the third configuration number is smaller than the second configuration number.

2. The apparatus of claim 1, wherein the processor determines the second configuration number so that the total time period is minimized.

3. The apparatus of claim 1, wherein
upon completion of the first task, the processor estimates a standard time period required for executing the second task by using one of the second circuits; and
the processor determines, based on the standard time period, the second configuration number.

4. The apparatus of claim 1, wherein
in a case where configuration of the first configuration number of the second circuits in the programmable circuit is completed before completion of the first task, the processor:
  estimates a completion time at which the first task is completed; and
  causes the programmable circuit to configure a second configuration number of the second circuits that are allowed to be configured in the programmable circuit until the estimated completion time.

5. The apparatus of claim 4, wherein
the processor:
  determines a third configuration number indicating a number of the second circuits for which a total time period from a start time at which configuration of the second circuits in the programmable circuit is started to an end time at which execution of the second task by the second circuits configured in the programmable circuit is completed is reduced; and
  when the third configuration number is greater than the second configuration number, causes the programmable circuit to configure the third configuration number of the second circuits.

6. The apparatus claim 1, wherein
the processor is further configured to estimate a configuration time-period required for configuring, in the programmable circuit, circuits for executing a task; and
the processor determines, based on the estimated configuration time-period, the first configuration number.

7. The apparatus of claim 1, wherein
the programmable circuit includes a plurality of blocks, in each of which a circuit is configurable; and
each set of circuits for executing a task is configured as one or more blocks whose number is determined in accordance with a scale of the each set of circuits.

8. A method for controlling an information processing device including a programmable circuit configured to configure circuits for executing tasks, the method comprising:
  estimating an execution time-period required for executing a first task by first circuits configured in the programmable circuit;
  determining a configuration number indicating a number of second circuits that are to be configured, in the programmable circuit, for executing a second task to be executed after the first task, based on the estimated execution time-period and a configuration time-period required for configuring the configuration number of the second circuits in the programmable circuit;
  causing the programmable circuit to configure, during execution of the first task, the configuration number of the second circuits;
  adjusting the number of second circuits that are to be configured, based on a relationship between a time at which the first task is completed and a time at which configuration of the second circuits in the programmable circuit is completed;
  determining a second configuration number indicating a number of the second circuits for which a total time period from a start time at which configuration of the second circuits in the programmable circuit is started to an end time at which execution of the second task by the second circuits is completed is reduced; and
  in a case where the first task is completed before configuration of the first configuration number of the second circuits in the programmable circuit is completed:
    causing the programmable circuit to stop configuration of a new circuit for the second circuits when a third configuration number indicating a number of the second circuits that are configured in the programmable circuit until completion of the first task is equal to or greater than the second configuration number, and
    causing the programmable circuit to configure the second configuration number of the second circuits in the programmable circuit when the third configuration number is smaller than the second configuration number.

9. A non-transitory, computer-readable recording medium having stored therein a program for causing a computer of an information processing device including a programmable circuit configured to configure circuits for executing tasks, to execute a process comprising:
  estimating an execution time-period required for executing a first task by first circuits configured in the programmable circuit;
  determining a configuration number indicating a number of second circuits that are to be configured, in the programmable circuit, for executing a second task to be executed after the first task, based on the estimated execution time-period and a configuration time-period required for configuring the configuration number of the second circuits in the programmable circuit;
  causing the programmable circuit to configure, during execution of the first task, the configuration number of the second circuits;
  adjusting the number of second circuits that are to be configured during execution of the first task, based on a relationship between a time at which the first task is completed and a time at which configuration of the second circuits in the programmable circuit is completed; and
  determining a second configuration number indicating a number of the second circuits for which a total time period from a start time at which configuration of the second circuits in the programmable circuit is started to an end time at which execution of the second task by the second circuits is completed is reduced; and
  in a case where the first task is completed before configuration of the first configuration number of the second circuits in the programmable circuit is completed:
    causing the programmable circuit to stop configuration of a new circuit for the second circuits when a third configuration number indicating a number of the second circuits that are configured in the programmable circuit until completion of the first task is equal to or greater than the second configuration number, and
    causing the programmable circuit to configure the second configuration number of the second circuits in the programmable circuit when the third configuration number is smaller than the second configuration number.

\* \* \* \* \*